US010776513B2

(12) United States Patent
White

(10) Patent No.: US 10,776,513 B2
(45) Date of Patent: *Sep. 15, 2020

(54) DEVICE USING SECURE STORAGE AND RETRIEVAL OF DATA

(71) Applicant: Visa International Service Association, San Francisco, CA (US)

(72) Inventor: David White, Oakland, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/018,469

(22) Filed: Jun. 26, 2018

(65) Prior Publication Data

US 2018/0300501 A1    Oct. 18, 2018

Related U.S. Application Data

(63) Continuation of application No. 14/967,066, filed on Dec. 11, 2015, now Pat. No. 10,037,436.

(51) Int. Cl.
*G06F 21/62* (2013.01)
*G06F 21/64* (2013.01)
(Continued)

(52) U.S. Cl.
CPC ........ *G06F 21/6245* (2013.01); *G06F 21/602* (2013.01); *G06F 21/64* (2013.01); *H04L 9/0822* (2013.01); *H04L 9/0825* (2013.01); *H04L 9/0894* (2013.01); *H04L 9/14* (2013.01); *H04L 9/321* (2013.01); *H04L 9/3247* (2013.01); *H04L 9/3263* (2013.01); *G06F 2221/2101* (2013.01);
(Continued)

(58) Field of Classification Search
CPC .................................................. G06F 21/6245
USPC ........................................................ 713/193
See application file for complete search history.

(56) References Cited

U.S. PATENT DOCUMENTS 7,203,844 B1   4/2007   Oxford
8,312,514 B2   11/2012  Anderson
(Continued)

FOREIGN PATENT DOCUMENTS

WO   2007086015 A3   8/2007

OTHER PUBLICATIONS

Extended European Search Report, dated Nov. 14, 2018, in European Patent Application No. 16873569.4, 9 pages.
(Continued)

*Primary Examiner* — Khalil Naghdali
(74) *Attorney, Agent, or Firm* — Kilpatrick Townsend & Stockton LLP

(57) ABSTRACT

An appliance is capable of storing and processing data related to details surrounding its ownership, behavior, and history within itself in a secure and unalterable way. The appliance may experience multiple transfers in ownership during its lifetime. Certain data stored in the appliance may be encrypted such that only qualifying parties (e.g., owners) may be able to access the data. Some data may remain private to an individual owner while other data may be made available to subsequent owners by passing a shared secret that can be utilized to decrypt the other data. Data may be stored in the appliance in chronological order and may be signed by appropriate parties such that it is not possible to alter the data without detection.

16 Claims, 12 Drawing Sheets

(51) Int. Cl.
*H04L 9/08* (2006.01)
*H04L 9/32* (2006.01)
*G06F 21/60* (2013.01)
*H04L 9/14* (2006.01)

(52) U.S. Cl.
CPC ............. *G06F 2221/2107* (2013.01); *G06F 2221/2147* (2013.01); *H04L 2209/805* (2013.01)

(56) References Cited

U.S. PATENT DOCUMENTS

| | | | |
|---|---|---|---|
| 8,566,578 B1 | 10/2013 | Banerjee | |
| 8,943,580 B2* | 1/2015 | Fadell | G06F 21/316 |
| | | | 726/19 |
| 9,235,532 B2* | 1/2016 | Callas | G06F 12/1408 |
| 9,424,430 B2* | 8/2016 | Rosenan | G06F 21/575 |
| 2004/0091114 A1* | 5/2004 | Carter | G06F 21/6218 |
| | | | 380/259 |
| 2005/0114686 A1 | 5/2005 | Ball et al. | |
| 2006/0168658 A1 | 7/2006 | Kallio | |
| 2013/0185560 A1 | 7/2013 | Eld et al. | |
| 2014/0008433 A1 | 1/2014 | Hammad | |
| 2014/0025680 A1 | 1/2014 | Moganti et al. | |
| 2014/0164776 A1 | 6/2014 | Hook | |
| 2014/0289507 A1 | 9/2014 | Sitrick | |
| 2015/0134552 A1 | 5/2015 | Engels et al. | |
| 2017/0126642 A1* | 5/2017 | Basin | H04L 9/3239 |

OTHER PUBLICATIONS

"Device Democracy—Saving the Future of the Internet of Things" IBM Institute for Business Value, Sep. 2014, http://www-01.ibm.com/common/ssi/cgi-bin/ssialias?infotype=PM&subtype=XB&htmlfid=GBE03620USEN, 28 pages.

"Empowering the Edge—Practical insights on a decentralized Internet of Things", IBM Institue for Business Value, Jun. 2015, http://www-01.ibm.com/common/ssi/cgi-bin/ssialias?subtype=XB&infotype=PM&htmlfid=GBE03662USEN&attachment=GBE03662USEN.PDF, 24 pages.

"Autonomous Decentralized Peer-to-Peer Telemetry", IBM Institute for Business Value, Jan. 2015, https://www.scribd.com/doc/252917347/IBM-ADEPT-Practictioner-Perspective-Pre-Publication-Draft-7-Jan-2015, 12 pages.

International Search Report / Written Opinion, dated Mar. 2, 2017, in PCT Application No. PCT/US2016/062762, 14 pages.

* cited by examiner

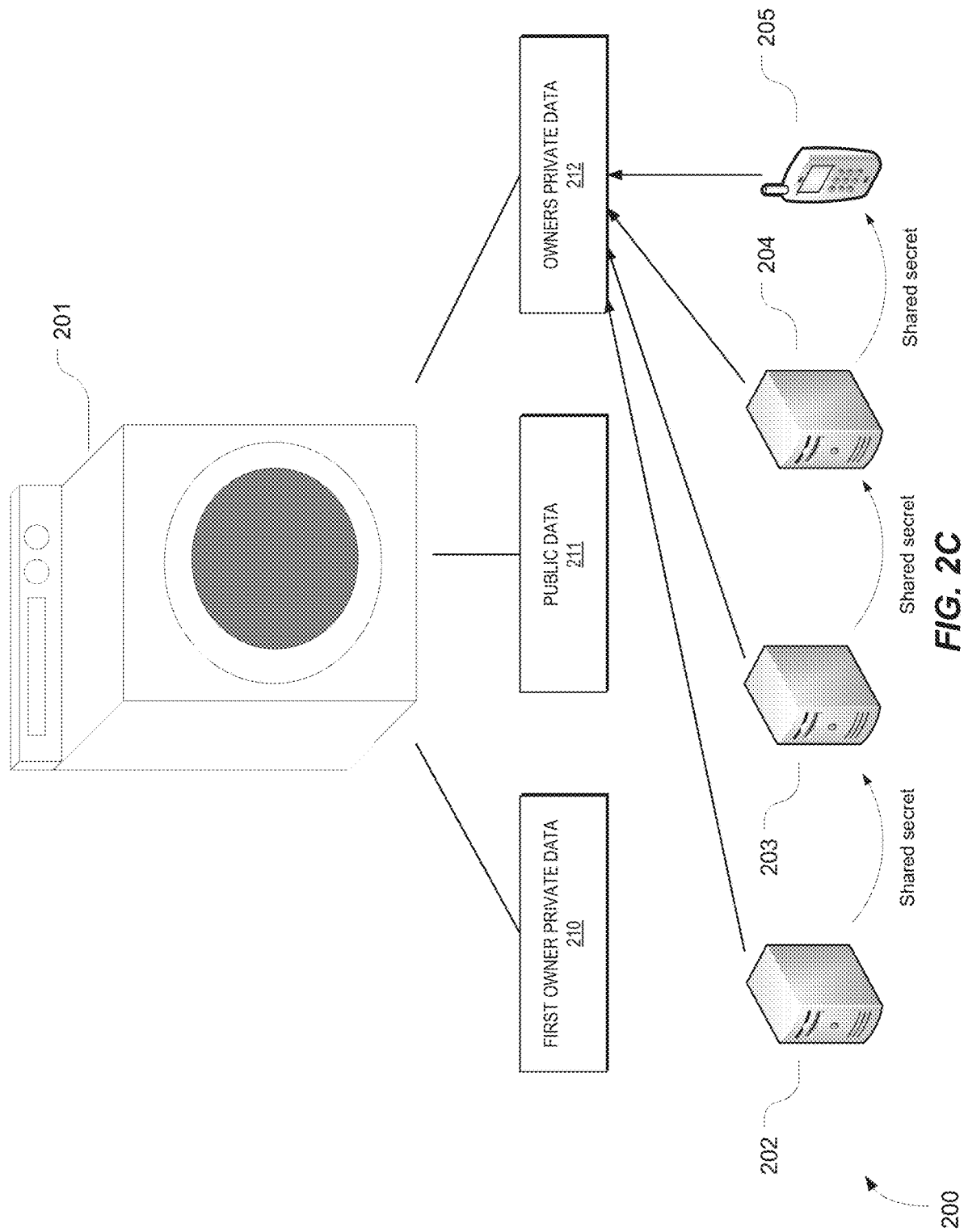

DEVICE USING SECURE STORAGE AND RETRIEVAL OF DATA

CROSS-REFERENCES TO RELATED APPLICATIONS

This application is a continuation application of U.S. patent application Ser. No. 14/967,066, filed on Dec. 11, 2015, which is herein incorporated by reference in its entirety.

BACKGROUND

An Internet of Things (IOT) device is any physical device that can communicate through a network with other devices, and/or people. These devices may have the ability to communicate with other devices over a communications network (e.g., Internet). One use case for such objects is to allow them to be monitored and remotely controlled. For example, an IOT device may be monitored and controlled over the communications network.

Most of the conventional IOT architectures are flat and cloud centric architectures. They are flat architectures, because devices are expected to communicate directly with each other with just an Internet router or two between objects and the communications network. They are cloud centric architectures because all communications between devices, as well as between devices and users, typically go through a central cloud network.

Data (e.g., transfer of ownership data) regarding such devices (whether IOT devices or not) can be stored remotely in the cloud. However, this presents a number of challenges. Firstly, such data that is stored remotely is susceptible to data breaches. Further, the owners of the devices have less control over the data, since it is typically managed by some central entity that may or may not have an interest in the devices. Furthermore, once one owner of a device disposes of the device, the history associated with that owner's ownership of that device that is stored in the cloud could be replaced or become inaccessible.

While the above-described architectures can be used, a number of improvements could be made.

Thus, new and enhanced methods for storing and retrieving device data are needed. Embodiments of the invention address these and other problems, individually and collectively.

BRIEF SUMMARY

Embodiments of the invention are directed to systems and methods related to the storage and retrieval of device data in an appliance, including ownership, behavioral, and historical data, across multiple ownership transfers. In embodiments of the invention, appliance data may be stored and managed by the appliance itself. Embodiments enable a way to securely store data associated with an appliance within the appliance in an unalterable state. In some cases, appliance data stored in the appliance may be signed or verified so that a change in data may be detected.

Ownership of the device may provide an owner with certain rights. For example, the owner may have the right to access and make available certain data stored in the appliance, to control the appliance, to delegate the right to utilize the appliance, and to transfer the ownership of the appliance to a new owner. In some cases, the appliance securely stores and manages access to data that it stores based on multiple ownership transfers across various owners (e.g., manufacturer, distributor, consumer, etc.).

One embodiment of the invention is an appliance comprising a processor, a memory coupled to the processor, one or more state monitoring sensors coupled to the processor, and a computer-readable medium coupled to the processor, including code that is executable by the processor, for implementing a method. The method may be performed by an appliance. The appliance may receive a first encryption key and a second encryption key associated with a first owner of the appliance and may store the first encryption key and the second encryption key in the appliance. The appliance may encrypt first owner private data stored in the appliance using the first encryption key, wherein the first owner private data is not accessible to a subsequent second owner of the appliance. The appliance may further encrypt owners private data stored in the appliance using the second encryption key, wherein the owners private data is accessible by the subsequent second owner of the appliance. In some embodiments, the first encryption key and the second encryption key are symmetric encryption keys.

In some embodiments, a transfer of ownership of the appliance may be conducted. The appliance may receive an indication from a first owner device associated with the first owner that there is a transfer of ownership of the appliance from the first owner to the second owner of the appliance. The appliance may then generate an ownership transfer entry comprising information related to the transfer of ownership of the appliance and may store the ownership transfer entry. The appliance may receive, from the first owner device, ownership transfer data including the second encryption key. In some cases, the second encryption key may be encrypted by the first owner device. The appliance may then store the ownership transfer data in the ownership transfer entry.

The appliance may further receive, from the second owner device associated with the second owner, a decryption request for the ownership transfer information. The appliance may decrypt the encrypted ownership transfer information and may retrieve the second encryption key from the decrypted ownership transfer information. The appliance may send the second encryption key to the second owner device.

The second owner device may utilize the second encryption key to access the owners private data. The appliance may receive, from the second owner device, a decryption request including the second encryption key for the second data. The appliance may decrypt the encrypted owners private data and retrieve the owners private data. The appliance may send the owners private data to the second owner device.

In some embodiments, prior to encrypting the first owner private data, the appliance may monitor, by the one or more state monitoring sensors, first data related to the appliance. The appliance may generate the first owner private data based on the first data and may store the first owner private data. Further, in some embodiments, prior to encrypting the owners private data, the appliance may monitor, by the one or more state monitoring sensors, second data related to the appliance. The appliance may generate the owners private data based on the second data and may store the owners private data.

In some implementations, the first owner private data may be accessible to only the first owner of the appliance. Additionally, in some implementations, the owners private data is accessible to the first owner and the second owner of the appliance.

In some embodiments, the appliance may ensure that data stored in the appliance cannot be altered without detection. The appliance may generate a digest of the first owner private data and owners private data and may digitally sign the first. The signed digest may be stored in the appliance.

These and other embodiments of the invention are described in further detail below.

BRIEF DESCRIPTION OF DRAWINGS

FIG. 2A-2C show an exemplary system including an appliance with data accessible to certain devices according to embodiments of the invention.

DETAILED DESCRIPTION

Figure 1:
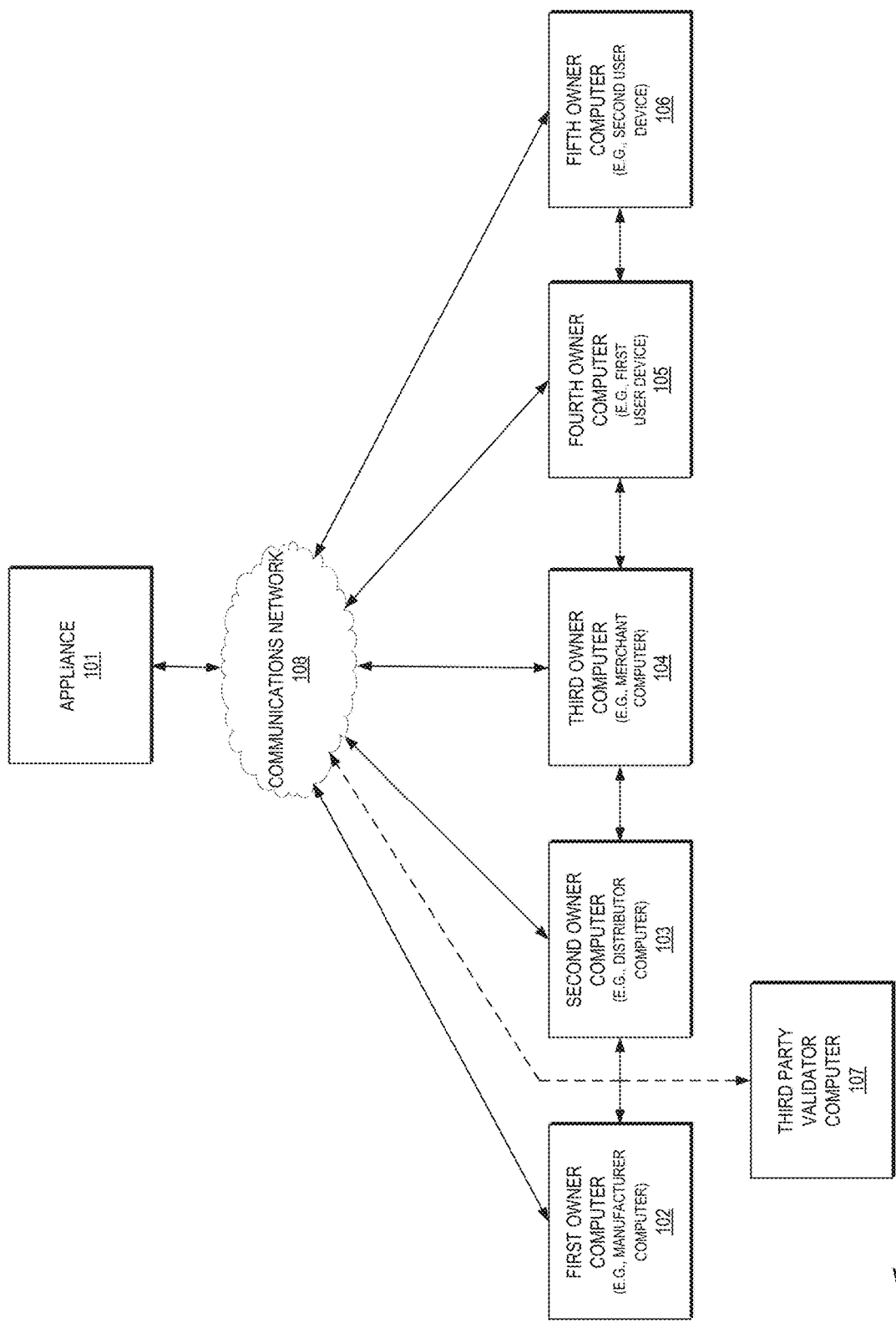
FIG. 1 shows a block diagram of an exemplary system according to embodiments of the invention.

Embodiments of the invention are directed to systems and methods related to secure storage and retrieval of appliance state data for an appliance experiences multiple transfers in ownership. An appliance may store information related to their behavior and history in a secure and if desired, an unalterable way. Certain data stored in the appliance may be made accessible to appropriate owners by the device itself.

Conventional systems include devices that monitor their data utilizing a flat and cloud centric architecture. For example, such devices may directly communicate with each other over a communication network. Further, the devices may rely on a central cloud to enable communication between multiple devices and between devices and users. This conventional approach presents several issues. The conventional architecture removes control of the devices from the actual owners of the devices. Embodiments of the invention enable devices to be registered as belonging to an owner and then allow the owner to control the use of that device.

Embodiments of the invention provide direct benefits, such as theft prevention and also facilitates the use of a layered, "cloud optional" architecture. A cloud optional architecture can give control of devices to their owners by allowing direct communication between devices and users and forgoing the need for an intervening cloud. This not only protects privacy of data, but provides a more secure and scalable architecture. Since data and mechanisms to securely store and retrieve the data exist within a network enabled appliance, this forgoes the need to utilize external storage and communicate with a remote server to access the data. Further, a layered architecture can simplify the way in which owners can control their devices while improving security, by enabling more layers of security, and scalability, by pushing processing out to the edges of the network (e.g., instead of to a central entity).

Embodiments of the present invention enable secure storage of ownership data and behavioral data by an appliance and enable transfer of ownership of the appliance. The appliance may be owned by an owner. The owner may operate a computing device that can communicate with the appliance. Appliance ownership may determine what data stored within the appliance is accessible by whom. For example, the owner of the appliance may designate access rights to certain data stored within the appliance. In some cases, providing access to data in the appliance may comprise securely passing a shared secret, which may be an encryption key, which can be utilized to decrypt the data. Accordingly, the data can be protected against unauthorized access.

In some cases, data stored in the appliance may be unalterable once recorded by the appliance. Changes in ownership may lock data previously stored in the appliance such that it cannot be inappropriately altered. Ownership of the appliance confers on the owner of the device the right to access certain data stored in the appliance, to control the appliance, to delegate the right to use the appliance, and to transfer the appliance to a new owner.

Prior to discussing embodiments of the invention, description of some terms may be helpful in understanding embodiments of the invention.

An "appliance" may be an object comprising a data processor that can communicate with other devices. In some embodiments, an appliance can be a device that is designed to perform a specific task. For example, an appliance can be a refrigerator where the primary function of the refrigerator is to keep food preserved or a thermostat where the primary function of the thermostat is to control the temperature within a dwelling.

Additional characteristics of the appliance are described herein. For example, the appliance can have wireless communication capabilities. The appliance can be associated with an owner, which may be a person or entity. The appliance can store various public and private data. Further, the appliance may have the capability to monitor its state by storing data gathered related to its behavior (e.g., usage data, shock data, etc.) and surrounding environment (e.g., temperature, humidity, etc.). The appliance can also store ownership transfer data indicating a change in ownership of the appliance from one owner to another owner. The appliance may have the capability to encrypt data to provide access to certain data stored within the appliance by specific owners. Further, data stored in the appliance can be made unalterable, since data already stored by the appliance can be locked during a change in ownership.

Upon creation, the appliance may be assigned at least one key pair, so that the appliance itself can digitally sign certain data. The key pair including a public key and a private key may be assigned by a suitable trusted third party, or the creator (e.g., manufacturer) of the appliance. By allowing a trusted third party to assign the key pair, this avoids any potential risk of the creator of the appliance using its knowledge of the private key to inappropriately alter or access data in the appliance. However, embodiments of the invention do not require that a trusted third party issue the key pair for the appliance. The private key from the key pair may be stored securely within the appliance, such as in a secure element. In some embodiments, the private key may only exist within the appliance (or it could exist within a software secure element that is only accessible by the appliance and that is stored in the cloud at a remote computer). The public key may be accessible through a message or interface that can be utilized by any owner of the appliance.

In some cases, the appliance may be a machine that can perform a domestic task. For example, the appliance may be a thermostat, washing machine, a drying machine, a microwave, a toaster, a blender, a refrigerator, or other device that may be found around a residence. However, embodiments are not so limited, as the appliance may also be any other type of suitable device with wireless communication capabilities that may be owned by an individual or entity. Other examples of appliances include televisions, certain mobile devices such as wearable devices (e.g., smart watches, fitness bands, jewelry, etc.), personal digital assistants (PDAs), and automobiles with remote communication capabilities.

An "owner" may be a person or entity that has possession of an object. The person or entity in possession of the object may or may not have legal title to the object. In some embodiments of the invention, the owner may legally own the appliance and may have the appliance in their physical possession. An owner may be associated with at least one public and private key pair. In some cases, the owner of the appliance may be referred to as the current owner of the appliance. In some implementations, the current owner may be indicated in data associated with the most recent ownership transfer of the appliance.

In some embodiments, a "first owner" may be a person or entity that initially holds ownership of an appliance. The first owner may be the first person or entity to own the appliance and typically have the appliance in their possession. The first owner may have the capability to enable the appliance to start monitoring its state data. For example, the first owner may turn on (e.g., manually by a button or voice command, or by installation of battery or other power source) state monitoring capability associated with the appliance for the first time, which may trigger the appliance to start storing its state data (e.g., storage and transit data). The first owner may be associated with and operate a first owner computer or first owner device that can be utilized to communicate with and control the appliance. In some cases, the first owner may be the manufacturer, creator, or artist of the appliance. The first owner may also be known as the "initial owner" or by any other suitable name.

A "second owner" may be a person or entity that holds ownership of the appliance after ownership is transferred from the first owner. The second owner may have the appliance in their possession after receiving the appliance from the first owner. The second owner may be associated with and operate a second owner computer that can be utilized to communicate with and control the appliance. In some cases, the second owner may be a distributor of the appliance.

"Subsequent owners" may be any of the individuals or entities that may hold ownership of the appliance after a certain owner holds ownership of the appliance. For example, if the current owner is the manufacturer, the subsequent owners following the manufacturer may include the distributor, a merchant, a first user (consumer), and a second user (consumer).

Although in some contexts the use of the terms "first," "second," third," etc. may be used to indicate a particular sequence (e.g., ownership or possession of an object over time), it is understood that in other embodiments, such terms need not be limited to a particular sequence and that the terms "first," "second," third," etc. may simply be used to indicate separate entities, actions, or objects.

A "manufacturer" may be an entity that makes an object, such as an appliance. In some embodiments, the manufacturer may be associated with a computing device, such as a manufacturer computer, that can communicate with the appliance. The manufacturer may make the appliance such that it stores manufacturer specific data (e.g., manufacturer details, production details, etc.). In some cases, the manufacturer may be the first owner of the appliance. The manufacturer may be associated with at least one public and private key pair.

A "distributor" may be an entity that distributes an object such as an appliance. For example, the distributor may be a resource providing entity that sells the appliance to a resource providing entity (e.g., merchant). The distributor may be associated with a computing device, such as a distributor computer, that can communicate with the appliance. In some cases, the distributor may be the second owner of the appliance.

A "user" may be an individual or entity that uses an object. A user may utilize an appliance for its intended purpose. In some cases, the user may be an owner of the appliance. In other cases, the user may be authorized to utilize the appliance by the owner of the appliance. For example, the user may be renting the appliance from the owner. The rules for use of the appliance may be based on a contract or at the will of the owner.

An "interested party" may not be a user, but may be an individual or entity that has an interest in something. In some embodiments, the interested party may have an interest in the appliance. In some embodiments, the relationship between the interested party and the appliance or owner may be defined by a contract. Some examples of the interested party include a loan company, an insurance company, or the like.

A "third party validator" may be associated with a trusted third party that can validate data of the appliance. The third party validator may be associated with at least one public and private key pair. The third party validator may be associated with a third party validator computer, which can sign data to ensure that the data stored in the appliance is not altered after initial storage. This can prevent an owner (e.g., manufacturer) from tampering with resting data of the appliance. In some embodiments, the third party validator may be a payment processing network that can verify payment data stored by an entity within the appliance.

A "third party certification body" may provide certification. In some embodiments, it may be an organization independent from owners and entities related to the appliance that can certify certain data for the appliance. In some cases, the third party certification body may be an entity that conducts tests on the appliance and provides certification based on results of the tests. In other cases, the third party certification body (e.g., certification computer) may serve as a third party validator and sign data, so that the third party certification body can keep a record of certain data stored in the appliance. This can help ensure that data stored in the appliance is not altered after initial storage. Some examples of third party certification bodies include Underwater Laboratories (UL), Federal Communications Commission (FCC), and "notary" (signing) services.

A "transfer of ownership" may be an event that indicates that the owner of an object has changed. For example, in some embodiments, a transfer of ownership may be an event that indicates that ownership of the appliance has changed. Typically, during a transfer of ownership, physical possession of the appliance may shift from one owner to another owner. Exemplary cases of transfer of ownership include the manufacturer delivering the appliance to the distributor or the distributor selling the appliance to a consumer. The transfer of ownership may also be known as "a change in ownership," an "ownership transfer," or other suitable name. In some embodiments, entities involved in the transfer of ownership (e.g., current owner and subsequent owner) may have a negotiation about the data that is to be made accessible to the subsequent owner as a result of the transfer of ownership.

"Ownership transfer data" may be any information related to a transfer of ownership event. Ownership transfer data may include identification information for the entities for which the transfer of ownership is being conducted. Ownership transfer data may also include information related to one or more encryption keys, which can be made available to the new owner upon the transfer of ownership. Ownership transfer data may also be digitally signed by certain entities to ensure that data already stored by the appliance cannot be altered.

"Owner private data" may be data that is intended to belong to a single individual or entity. In some cases, the owner private data may be data that can only be accessed by a single owner of the appliance. The owner private data may be stored in the appliance during the period that the single owner holds ownership of the appliance. The owner private data may comprise data that the single owner determines should not be shared with other parties, including any subsequent owner of the appliance. If the manufacturer is the owner of the appliance, an example of the owner private data added by the manufacturer may be manufacturing details the manufacturer believes should remain confidential.

"Owners private data" may be data that is intended to belong to multiple individual or entities. In some cases, the owners private data may be data that can be accessed by any owner of the appliance. In some implementations, the owners private data may be encrypted such that only owners that are capable of decrypting the encrypted owners private data may access the owners private data. The owners private data comprises data that an owner determines may be shared a subsequent owner of the appliance. In some embodiments, each owner of the appliance may add owners private data to the appliance. If the manufacturer is the owner of the appliance, an example of owners private data added by the manufacturer may be storage and transit data that the manufacturer determines may be useful to subsequent owners. For example, it may be useful for the subsequent owners to check that the appliance was not stored in extreme temperatures (e.g., based on temperature data) or dropped during transit (e.g., based on shock data).

A "server computer" may typically be a powerful computer or cluster of computers. For example, the server computer can be a large mainframe, a minicomputer cluster, or a group of servers functioning as a unit. The server computer may be associated with an entity such as a payment processing network, a merchant, an authentication cloud, an acquirer, or an issuer.

A "resource providing entity" may be an entity that may make resources available to a user. Examples of resource providing entities include distributors, merchants, vendors, suppliers, owners, traders, and the like. In some embodiments, such entities may be a single individual, small groups of individuals, or larger groups of individuals (e.g., companies). Resource providing entities may be associated with one or more physical locations (e.g., supermarkets, malls, stores, etc.) and online platforms (e.g., e-commerce websites, online companies, etc.). At the physical locations, the resource providing entity may host an access device. In some embodiments, resource providing entities may make available physical items (e.g., goods, products, appliances, etc.) to the user. In other embodiments, resource providing entities may make available digital resources (e.g., electronic documents, electronic files, etc.) to the user. In other embodiments, resource providing entities may manage access to certain resources by the user.

A "payment processing network" may include data processing subsystems, networks, and operations used to support and deliver authorization services, and clearing and settlement services. For example, the payment processing network may comprise a server computer, coupled to a network interface, and a database of information. The payment processing network may include wired or wireless network, including the internet. An exemplary payment processing network includes VisaNet®, operated by Visa®. Payment processing networks such as VisaNet™ are able to process credit card transactions, debit card transactions, and other types of commercial transactions. VisaNet™, in particular, includes a VIP system (Visa Integrated Payments system), which processes authorization requests and a Base II system which performs clearing and settlement services. In some embodiments, the payment processing network may serve as a third party validator computer.

A "computing device" may be any suitable electronic device that can process and communicate information to other electronic devices. The computing device may include a processor and a computer readable medium coupled to the processor, the computer readable medium comprising code, executable by the processor. The computing device may also each include an external communication interface for communicating with each other and other entities. A mobile device, a cardholder device, a user device, a consumer device, a server computing device, an appliance, and any computer may be exemplary types of computing devices.

Embodiments of the invention are directed to an appliance that is capable of storing data related to details surrounding its ownership, behavior, and history within itself in a secure and unalterable way. The appliance may also have the ability to process that data. Hence, the appliance may be a device that is "self-aware." In some embodiments, data managed by the appliance may be stored in "entries" (e.g., data entries). Contents in theses entries may be encrypted such that only qualifying parties may be able to access the data. Different types of owners and users may interact with the appliance over its lifetime and certain rules may cover which entities can create what type of data and which entities can access that data. The owner of the appliance can control use of the appliance by delegating authority. It may be up to the owner of the appliance to determine what data they want to protect. In some cases, there may be default protection for certain data types designated by the appliance or the owner.

In order to ensure that the data within the appliance is unalterable, the data may be digitally signed by appropriate parties. Which entity signs the data and how the data is signed can depend on the type of data being signed. In some cases, an entity may sign data already signed by the appliance itself to ensure protection against exposure of encryption keys of the appliance. Additionally, when an entity signs a data entry, they may also be signing a digest of all previous data stored by the appliance to "lock" that data from being altered. Certain signing entities (e.g., owners) may choose to sign data within the appliance on a periodic basis, rather than signing every individual entry stored in the appliance in order to reduce volume of stored data. Some exemplary entities that may sign data include the original creator (e.g., manufacturer) of the appliance, the current owner of the appliance, the parties involved in a transfer of ownership of the appliance, the appliance itself, parties to a contract for the appliance, and independent third parties certifying the appliance or its stored data. Certain signed data may be public data, such as failure data, but other data, such as sensor history data, may be private.

In some embodiments, in addition to being signed, the entries stored within the appliance may be chained in chronological order. Once stored in the appliance and signed, data may be unalterable without detection by using a certification mechanism provided by a trusted third party. Hence, data may remain unalterable and be stored in strict sequence. Certain public data in the appliance may need no protection against access, but may still be protected against alteration. It is not required that all data within the appliance is controlled utilizing the above mechanism. However, lifecycle data and ownership data of the appliance may typically be secured using this mechanism.

While optional, data stored by the appliance may be protected against data loss. To do this, the data may be replicated to, or synchronized with, an external storage. However, the system of record may be the copy of data stored within the appliance, so long as the copy is undamaged. Encrypted data stored within the appliance may have the same protection when communicated externally. When data is stored externally, there may be a mechanism to tie the appliance to the data. Although data may normally reside within the appliance, embodiments may still be functional using externally stored data. It is noted that embodiments of the invention do not require data to be stored externally.

FIG. 1 shows a block diagram of a system 100 according to an embodiment of the invention. The system 100 is for storing and managing device data across multiple ownership transfers. The system 100 includes an appliance 101. It also includes first owner computer 102, a second owner computer 103, a third owner computer 104, a fourth owner computer 105, and a fifth owner computer 106. Additionally, the system 100 includes a third party validator computer 107. Any of the entities may be in communication by a communications network 108. While only five owner computers are shown in FIG. 1 for simplicity, it can be presumed there any suitable number of owner computers may exist. Additionally, while only one third party validator computer is shown in FIG. 1 for simplicity, it can be presumed that any suitable number of third party validator computers may exist.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communications protocol.

Appliance 101 may be any device with a computer with wireless communication capabilities. Appliance 101 can include a processor, a memory, input devices, and output devices, operatively coupled to the processor. Some non-limiting examples of appliance 101 may include domestic appliances (e.g., washing machine, a drying machine, a blender, a microwave, a toaster, a refrigerator, etc.), televisions, mobile devices (e.g., cellular phones, keychain devices, personal digital assistants (PDAs), pagers, notebooks, notepads, wearable devices (e.g., smart watches, fitness bands, jewelry, etc.), automobiles with remote communication capabilities, personal computers, and the like. Appliance 101 may store ownership information, behavioral information, and other historical information related to appliance 101. Further details of an exemplary appliance are provided in FIG. 3.

First owner computer 102 may be associated with a computing device associated with a first owner of appliance 101. The first owner computer 102 may be operated by the first owner and can have wireless communication capabilities. The first owner computer 102 may send shared secrets (e.g., symmetric keys) associated with the first owner to appliance 101, which can store the shared secrets in a secure memory element. The first owner computer 102 may communicate with appliance 101 by sending encryption and decryption requests for certain data stored in appliance 101. The first owner computer 102 may add data associated with the first owner to appliance 101. The first owner computer 102 may also digitally sign certain data stored in appliance 101. In some cases, the first owner computer 102 may be a manufacturer computer associated with a manufacturer of appliance 101.

Second owner computer 103 may be a computing device associated with the second owner of appliance 101. The second owner computer 103 may be operated by the second owner and can have wireless communication capabilities. The second owner computer 103 may send shared secrets (e.g., symmetric keys) associated with the second owner to appliance 101, which can store the shared secrets in a secure memory element. The second owner computer 103 may communicate with appliance 101 by sending encryption and decryption requests for certain data stored in appliance 101. The second owner computer 103 may add data associated with the second owner to appliance 101. The second owner computer 103 may also digitally sign certain data stored in appliance 101. In some cases, the second owner computer 103 may be a distributor computer associated with a distributor of appliance 101.

Third owner computer 104 may be a computing device associated with the third owner of appliance 101. The third owner computer 103 may be operated by the third owner and can have wireless communication capabilities. The third owner computer 104 may send shared secrets (e.g., symmetric keys) associated with the third owner to appliance 101, which can store the shared secrets in a secure memory element. The third owner computer 104 may communicate with the appliance 101 by sending encryption and decryption requests for certain data stored in the appliance 101. The third owner computer 104 may add data associated with the third owner to appliance 101. The third owner computer 104 may also digitally sign certain data stored in appliance 101. In some cases, the third owner computer 104 may be a merchant computer associated with a merchant of appliance 101.

Fourth owner computer 105 may be a computing device associated with the fourth owner of appliance 101. The fourth owner computer 105 may be operated by the fourth owner and can have wireless communication capabilities. The fourth owner computer 105 may send shared secrets (e.g., symmetric keys) associated with the fourth owner to appliance 101, which can store the shared secrets in a secure memory element. The fourth owner computer 105 may communicate with the appliance 101 by sending encryption and decryption requests for certain data stored in appliance

101. The fourth owner computer 105 may add data associated with the fourth owner to appliance 101. The fourth owner computer 105 may also digitally sign certain data stored in appliance 101. In some cases, the fourth owner computer 105 may be a first user device associated with a first user of appliance 101.

Fifth owner computer 106 may be a computing device associated with the fifth owner of appliance 101. The fifth owner computer 106 may be operated by the fifth owner and can have wireless communication capabilities. The fifth owner computer 106 may send shared secrets (e.g., symmetric keys) associated with the fifth owner to appliance 101, which can store the shared secrets in a secure memory element. The fifth owner computer 106 may communicate with appliance 101 by sending encryption and decryption requests for certain data stored in the appliance 101. The fifth owner computer 106 may add data associated with the fifth owner to appliance 101. The fifth owner computer 106 may also digitally sign certain data stored in appliance 101. In some cases, the fifth owner computer 106 may be a second user device associated with a second user of appliance 101.

Third party validator computer 107 may be associated with a trusted third party that can independently verify certain information related to appliance 101. Involvement of third party validator computer 107 may be optional. The third party validator computer 107 may be associated with at least one public and private key pair. Using the key pair, third party validator computer 107 may sign data within appliance 101 to ensure that the data is not inappropriately altered after initial storage. Since third party validator computer 107 may be able to detect any change based on the signed data, this can prevent an owner or user from tampering with resting data within appliance 101. In some embodiments, the third party validator computer 107 may sign data that is stored in appliance 101 at any time during its lifecycle. For example, the third party validator computer 107 may sign data that is stored by appliance 101 while it is owned by any owner (e.g., associated with first owner computer, second owner computer, third owner computer, etc.). As described above, in some cases, there may be multiple third party validator computers associated with multiple trusted third parties that can each verify certain information stored by appliance 101.

Communications network 108 may enable communication between devices. A suitable communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Any of the devices described herein (e.g., appliance 101, first owner computer 102, second owner computer 103, third owner computer 104, fourth owner computer 105, fifth owner computer 106, and third party validator computer 107, etc.) may be a computing device. Server computers may be computing devices.

Not all data in an appliance may be available to all parties. For example, usage data for an owner may be controlled by that owner and not necessarily be available to subsequent owners. For this reason, all data except data designated as "Public" may be encrypted using shared secrets (e.g., symmetric keys) that are only made available to the parties that are allowed access to the data. An owner may specify what portion of their data is public and what portion is not, or they may utilize default setting set by the appliance or themselves.

Figure 2A:
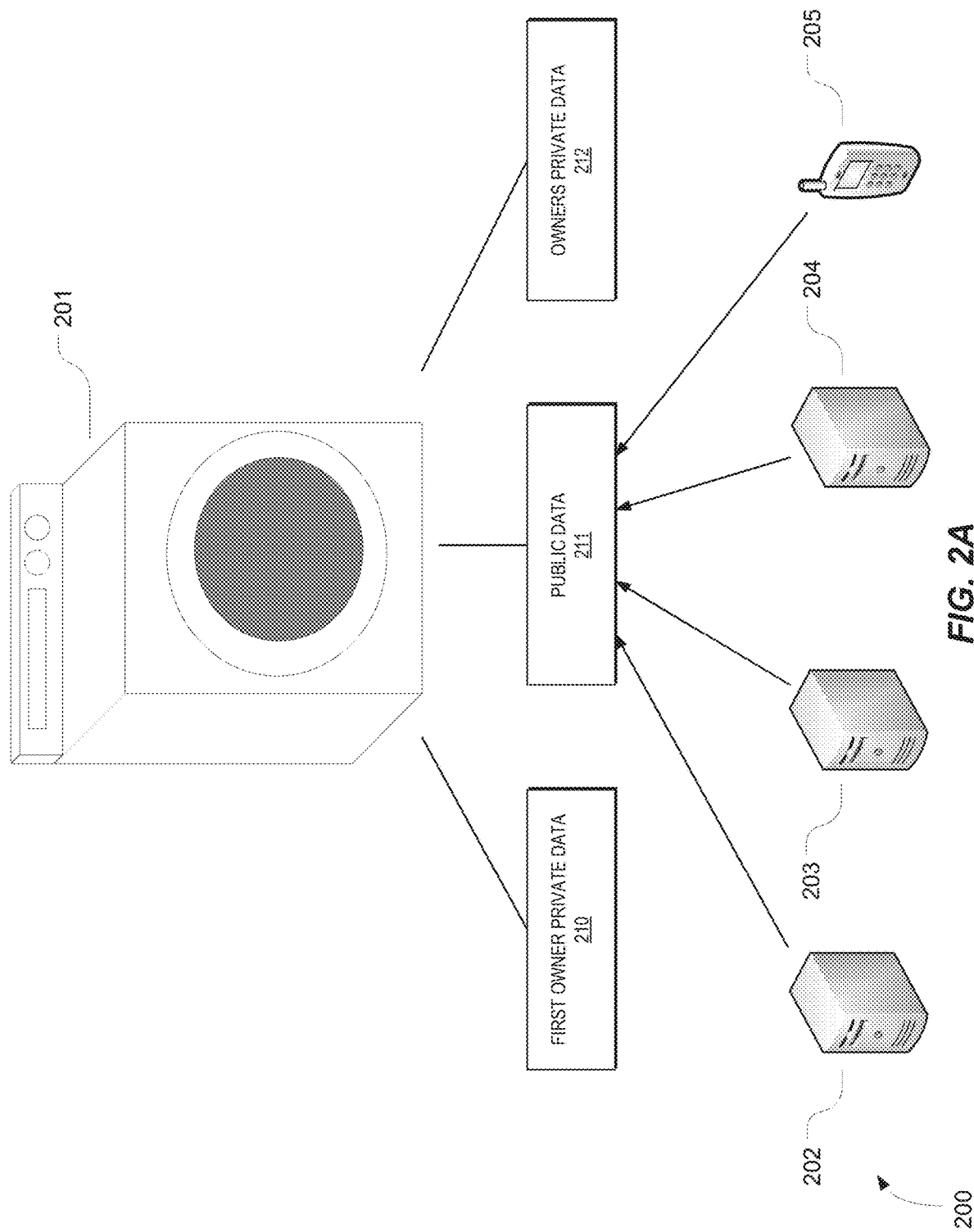
Figure 2B:
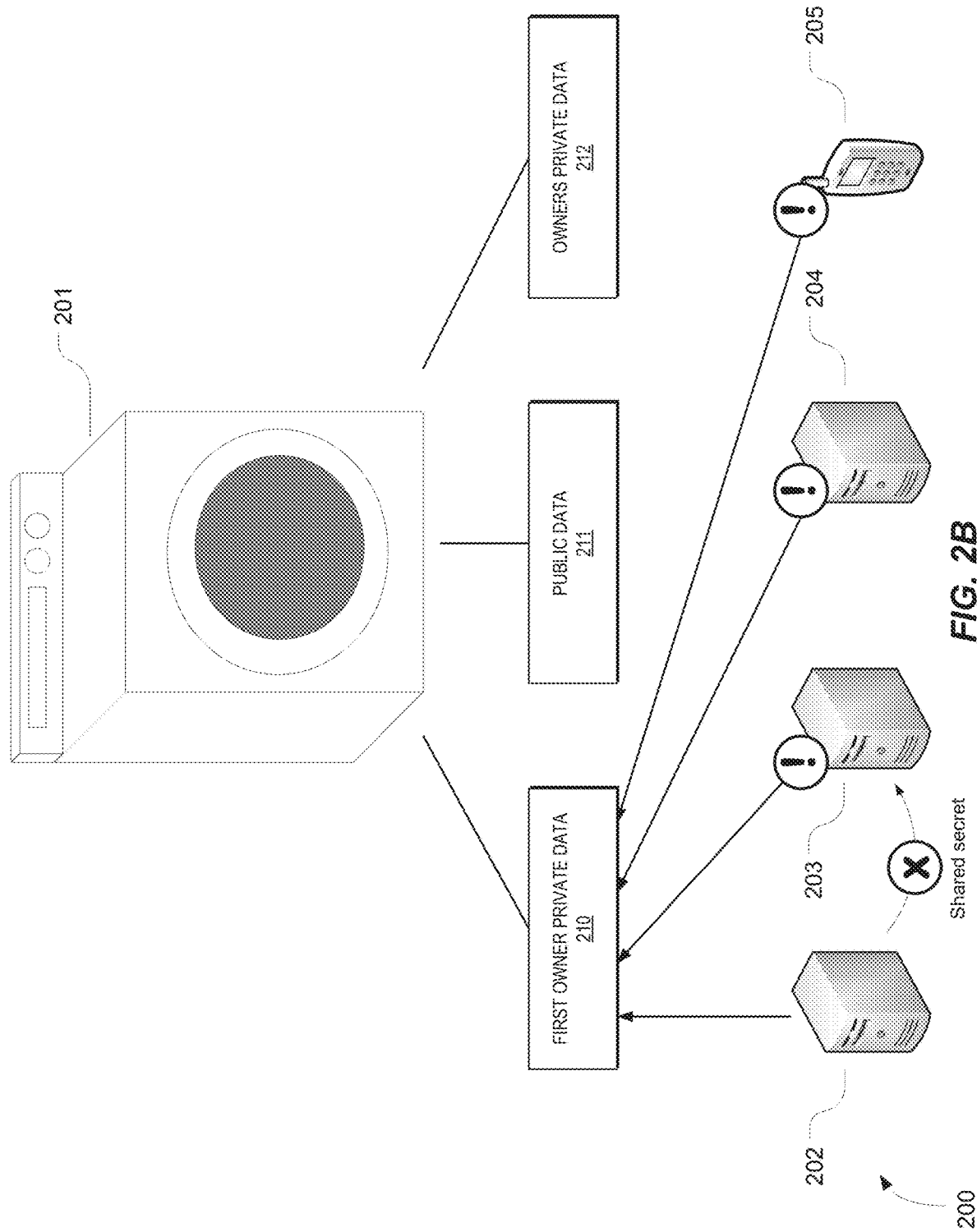

FIG. 2A-2C show an exemplary system 200 including an appliance 201 with data accessible to certain devices according to embodiments of the invention. Appliance 201 may store data including first owner private data 210, public data 211, and owners private data 212. While other data may be stored by appliance 201, it is not shown in the figures for simplicity. FIG. 2A-2C also include a first owner computer 202, a second owner computer 203, a third owner computer 204, and a fourth owner computer 205.

Appliance 201 may be may be a device that may experience multiple changes in ownership. Three transfers of ownership may take place prior to a fourth owner owning appliance 201. Initially, a transfer of ownership from a first owner (e.g., manufacturer) associated with first owner computer 202 to the second owner (e.g., distributor) associated with second owner computer 203 may occur. Next, a transfer of ownership from a second owner to the third owner (e.g., merchant) associated with third owner computer 204 may follow. At a later time, a transfer of ownership from a third owner to the fourth owner (e.g., first user) associated with fourth owner computer 205 may take place. An owner of appliance 201 may have control over appliance 201 and associated data during the period that they own appliance 201.

First owner computer 202 may be associated with a first owner of appliance 201, second owner computer 203 may be associated with a second owner of appliance 201, third owner computer 204 may be associated with a third owner of appliance 201, and fourth owner computer 205 may be associated with a fourth owner of appliance 201. In some embodiments, the first owner may be a manufacturer and first owner computer 202 may be a manufacturer computer, the second owner may be a distributor and second owner computer 203 may be a distributor computer, the third owner may be a merchant and third owner computer 204 may be a merchant computer, and the fourth owner may be a first user and fourth owner computer 205 may be a first user device.

Public data 211 may be data associated with appliance 201 that is available without restriction. Public data 211 may be stored on appliance 201 and made accessible through a public interface. For example, public data 211 may be freely viewed on a display on appliance 201 by an individual in possession of appliance 201. In another example, public data 211 may be viewed without constraint through an interface (e.g., Application Program Interface (API)) controlled by appliance 201. In some embodiments, public data 211 may include an owner manual, specifications sheets, marketing materials, communications specifications, object disposal data, and object metadata (e.g., types of data stored). Any entity, including non-owners, may be able to access public data 211.

As shown in FIG. 2A, any owner of appliance 201 can access public data 211. For example, first owner computer 202, second owner computer 203, third owner computer 204, and fourth owner computer 205 may view public data 211 by directly interacting with appliance 201 (e.g., activating input elements of appliance 201) or by sending a request for public data 211. Additionally, during the period that an owner holds ownership over appliance 201, the owner can add or take away data from public data 211. This is because it is up to the owner of appliance 201 to determine which data should be public.

Over the lifecycle of appliance 201, the data in public data 211 may change. For example, when the first owner (e.g., manufacturer) associated with first owner computer 202 holds ownership over appliance 201, first owner computer 202 may add specifications sheets to public data 211 of appliance 201. After a first transfer in ownership to the second owner (e.g., distributor), the second owner computer 203 associated with the second owner may access the specifications sheets and further add marketing materials to public data 211 of appliance 201. After a second transfer in ownership to the third owner (e.g., merchant), the third owner computer 204 associated with the third owner may access the specifications sheets and the marketing materials. Prior to the third transfer in ownership to the fourth owner (e.g., first user), the third owner may determine that the marketing materials should not be public. Third owner computer 204 may then remove the marketing materials from public data 211 of appliance and encrypt the marketing materials data. Accordingly, after the third transfer in ownership, fourth owner computer 205 associated with the fourth owner may access the specifications sheets, but not the marketing materials.

First owner private data 210 may be data associated with appliance 201 that is only accessible by the first owner of appliance 201. First owner private data 210 may include data that the first owner determined to be private and should not be accessed by subsequent owners of appliance 201. First owner private data 210 may be data added to appliance 201 by first owner computer 202 or collected by sensors in appliance 201. In some embodiments, first owner private data 210 may include manufacturing details that are useful to the first owner (e.g., manufacturer). Such manufacturing details may include which factory, machine, or operator manufactured the appliance. Such information may be of interest to a manufacturer, but would not be information that others should know as the manufacturing operations may be considered secret information for that manufacturer. First owner private data 210 may be encrypted so that only first owner computer 202 can decrypt and access the data in first owner private data 210.

As shown in FIG. 2B, only the first owner computer 202 associated with the first owner can access first owner private data 210. During the period for which the first owner has ownership over appliance 201, the first owner computer 202 may add data (e.g., manufacturing details) to first owner private data 210 of appliance 201. First owner computer 202 may request appliance 201 to encrypt first owner private data 210 utilizing a suitable shared secret, such that only first owner computer 202 possessing the shared secret may decrypt first owner private data 210.

For example, a shared secret associated with the first owner may be utilized to encrypt first owner private data 210. In some embodiments, the shared secret may be a symmetric encryption key. The shared secret may only be known by first owner computer 202 and appliance 201. In some embodiments, the first owner computer 202 may securely send the shared secret to appliance 101 (e.g., preferably by an out-of-band channel). First owner computer 202 may not send the shared secret during the transfer of ownership of appliance 201 to second owner computer 203. Hence, only the first owner computer 202 may successfully decrypt or request appliance 201 to decrypt first owner private data 210 utilizing the shared secret.

In other embodiments, first owner private data 210 may be encrypted using an asymmetric encryption key. For example, first owner computer 202 may be associated with a public-private key pair, where the public key is utilized to encrypt first owner private data 210 and the private key is utilized to decrypt first owner private data 210. However, any suitable encryption and decryption algorithms can be utilized as long as information that can be utilized to decrypt first owner private data 210 is only accessible to the first owner computer 202.

No matter how many transfers of ownerships take place for appliance 201, access rights to first owner private data 210 will not change. This is because first owner computer 202 may not make the shared secret needed to decrypt first owner private data 210 available to subsequent owners of appliance 201. Hence, even if second owner computer 203, third owner computer 204, and fourth owner computer 205 are associated with owners that own appliance 201, they may not possess the shared secret or other information necessary to decrypt first owner private data 210. While not shown in FIG. 2A-C, appliance 201 may also store second owner private data that can only be accessible by second owner computer 203, third owner private data that can only be accessible by third owner computer 204, and fourth owner private data that can only be accessible by fourth owner computer 205, regardless of transfer in ownership of appliance 202.

Owners private data 212 may be data associated with appliance 201 that is accessible to owners of appliance 201 that possess certain information. For example, owners that possess a certain shared secret may be able to access owners private data 212. In some embodiments, owners private data 212 may have a combination of data added by any owner that owned appliance 201 as well as data collected by sensors in appliance 201. Owners private data 212 may include data that an owner determined should be made available to subsequent owners of appliance 201, but with a certain level of security that is not applicable to public data. In some cases, owners private data 212 may include state monitoring data collected by appliance 201 during time periods for which appliance 201 was owned by the first owner, the second owner, the third owner, and the fourth owner. For example, owners private data 212 may include the number of hours that the appliance has been run it its lifetime. Each owner of the appliance 201 should be able to obtain this information. In another example, an initial owner may add information such as the repair history of the appliance 201 or performance data related to testing of appliance 201. Such information may be used by subsequent owners of the appliance 201.

During every transfer of ownership of appliance 201, a shared secret may be passed to the new owner to enable the new owner access to owners private data 212. For security purposes, the shared secret may not be directly transmitted to the new owner. Instead, the shared secret may be encrypted, such that the new owner may perform a decryption process to access the shared secret. Further details regarding the decryption process are explained in at least in FIG. 5.

As shown in FIG. 2C, an owner that possesses an appropriate shared secret may be able to access the owners private data 212. The shared secret shown in FIG. 2C may be a different shared secret from that shown in FIG. 2B. First owner computer 202 may add data to owners private data 212 of appliance 201 and encrypt owners private data 212 utilizing the shared secret. Alternatively, the owners private data 212 may also include data obtained by sensors in the appliance 201 or may be input by the user directly into the appliance 201. In some embodiments, the shared secret may be a symmetric key that can be utilized to encrypt and decrypt data. During a transfer of ownership from first owner to second owner, first owner computer 202 may make available (e.g., transmit) the shared secret to second owner computer 203. Thus, second owner computer 203 may then utilize the shared secret to access the data in owners private data 212 and may also add data into owners private data 212. In some embodiments, the shared secret may be encrypted before being sent.

Similarly, during a transfer of ownership from second owner to third owner, the second owner computer 203 may make available the shared secret to third owner computer 204. Third owner computer 204 may then utilize the shared secret to access owners private data 212 including data added by first owner computer 202 and second owner computer 203. Again, during a transfer of ownership from third owner to fourth owner, the third owner computer 204 may make available the shared secret to fourth owner computer 206, so that fourth owner computer 206 may utilize the shared secret to access owners private data 212. Hence, each owner may possess the shared secret for accessing owners private data 212 while they own appliance 201.

In other embodiments, owners private data 212 may be encrypted using an asymmetric key. Any suitable encryption and decryption algorithms can be utilized as long as information that can be utilized to decrypt owners private data 212 can be passed to appropriate owner of appliance 201.

While not described in FIG. 2A-C, it may be possible for an owner to change their mind about what data to make private or accessible. Such scenarios are described more in detail in FIG. 5.

Figure 3:
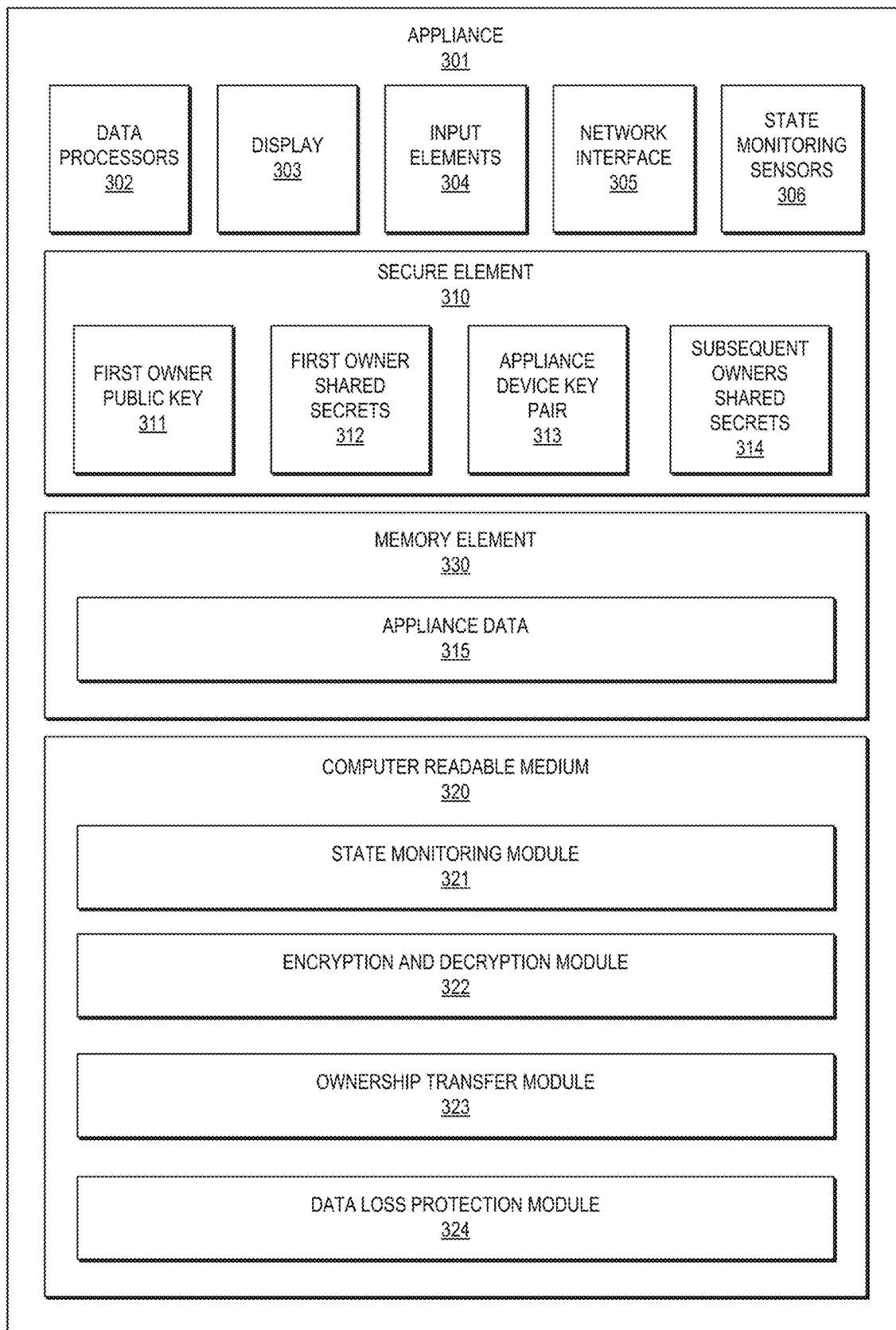
FIG. 3 shows an exemplary appliance according to embodiments of the invention.

FIG. 3 shows an exemplary appliance 301 according to embodiments of the invention. Appliance 301 includes data processors 302 and a display 303, input elements 304, a network interface 305, and state monitoring sensors 306 coupled to data processors 302. Appliance 301 also includes a secure element 310 and a memory element 330 coupled to data processors 302. Appliance 301 further includes a computer readable medium 320 coupled to data processors 302. The computer readable medium 320 comprises code, executable by data processors 302, the code comprising a state monitoring module 321, an encryption and decryption module 322, an ownership transfer module 323, and a data loss protection module 324.

Data processors 302 (e.g., microprocessors) may process functions of appliance 301. One exemplary function enabled by data processors 302 includes processing functions of display 303 to allow a consumer to see information (e.g., interfaces, messages, etc.). Data processors 302 may include hardware within appliance 302 that can carry out instructions embodied as code in a computer-readable medium 320.

An exemplary processor may be a central processing unit (CPU). As used herein, a processor can include a single-core processor, a plurality of single-core processors, a multi-core processor, a plurality of multi-core processors, or any other suitable combination of hardware configured to perform arithmetical, logical, and/or input/output operations of a computing device.

Display 303 may show information. In some embodiments, display 303 may have touch functionality and may display a user interface that may allow the owner or user of appliance 301 to select and interact with elements presented on display 303. The elements may include, but may not be limited to, menus, text fields, icons, and keys/inputs on a virtual keyboard. In some embodiments, display 303 may enable an owner or user to manually provide information to appliance 301 by directly touching display 303 with their finger or suitable touch screen stylus pen. In some embodiments, certain information requested by an owner computer from appliance 301 may be displayed on display 303.

Input elements 304 may enable information to be manually input to appliance 301. Exemplary input elements 304 include hardware and software buttons, audio detection devices (e.g., microphone), biometric readers, touch screens, and the like. An individual (e.g., owner or user) may activate one or more of input elements 304, which may pass information to appliance 301. In some cases, one or more of input elements 304 may be utilized to navigate through various user interface screens provided by appliance 301.

Network interface 305 may be any suitable combination of hardware and software that enables data to be transferred to and from appliance 301. Network interface 305 may enable appliance 301 to communicate data to and from another device (e.g., owner computer, user device, third party validator computer, etc.). Some examples of network interface 305 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by network interface 305 may include Wi-Fi™ (e.g., adhering to any suitable standards, such as IEEE 802.11ac, IEEE 802.11, etc.).

Data transferred via network interface 305 may be in the form of signals which may be electrical, electromagnetic, optical, or any other signal capable of being received by the external communications interface (collectively referred to as "electronic signals" or "electronic messages"). These electronic messages that may comprise data or instructions may be provided between network interface 305 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

State monitoring sensors 306 may include one or more devices that can detect and record information related to appliance 301 and its surrounding environment. The data collected by state monitoring sensors 306 may be stored by appliance 301. State monitoring sensors 306 may include a variety of sensor types, such as temperature, run time, shock, power utilization, and location sensors. Hence, state monitoring sensors 306 may record a variety of information, such as usage data (e.g., numbers of times utilized, length of time utilized to date, power usage data, etc.) and storage and transit data (e.g., temperature data, shock data, location data, etc.). State monitoring sensors 306 may collect information continuously or periodically. In some embodiments, certain sensors of state monitoring sensors 306 may be activated or deactivated based on owner preference. Further, sensors of state monitoring sensors 306 may periodically collect data based on time intervals designated to each sensor by the owner of appliance 301. Such owner preferences may be dynamically updated by the owner of appliance 301.

Secure element 310 may store any suitable sensitive information. For example, secure element 310 may store shared secrets and private keys associated with appliance 301, as well as other entities. In some embodiments, secure element 310 may store first owner public key 311, first owner symmetric keys 312, an appliance key pair 313 (e.g., a public-private asymmetric key pair), and subsequent owners symmetric keys 314. In some embodiments, one or more of the elements shown stored in secure element 310 may be stored in another suitable memory element within appliance 301, such as memory element 330, or at a remote server computer (e.g., in the cloud).

Memory element 330 may store any suitable data. Memory element 330 may be present within appliance 301, or may be detachable from the body of appliance 301. Memory element 330 may be in any suitable form (e.g., a memory chip, etc.). In some embodiments, memory element 330 may store any data related to appliance 301, including appliance data 315.

Figure 4:
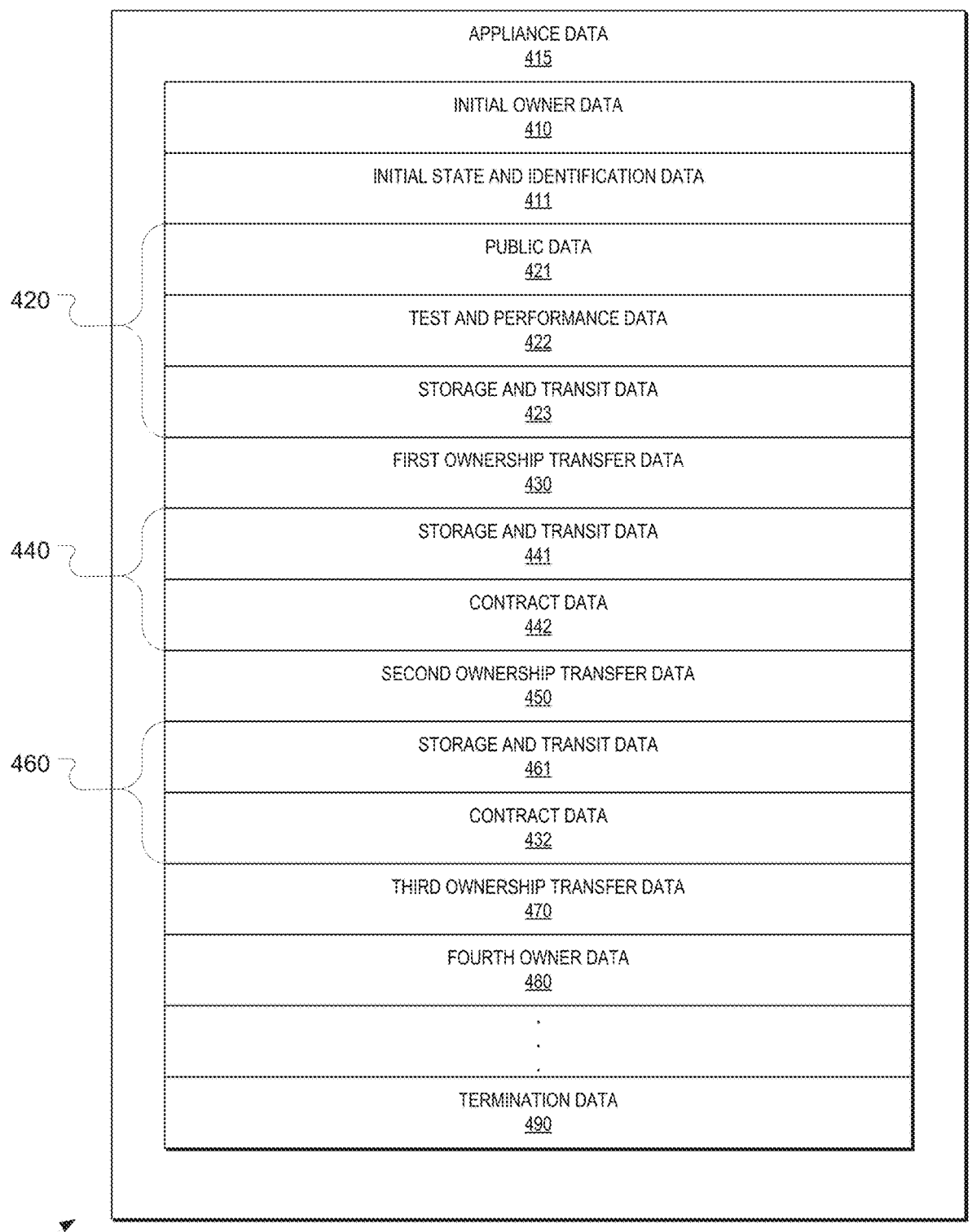
FIG. 4 shows a block diagram of exemplary data stored by an appliance according to embodiments of the invention.

Appliance data 315 may be data related to and stored by appliance 301. Appliance data 315 may include data added by multiple owners of appliance 301, as well as data collected by state monitoring sensors 306. In general, once created, data in appliance data 315 may be unalterable. Further, access to data in appliance data 315 may be controlled based on data type and user type. Data may be encrypted by enforcing cryptographic techniques as appropriate to control data access and ensure data privacy. In some cases, certain non-critical data (e.g., historical data collected by state monitoring sensors 306) of appliance data 315 may be truncated with the owner's permission, so long as a record of dates and number of entries truncated is made available to subsequent owners. In some embodiments, appliance data 315 may be stored as a sequence of entries (e.g., data entries) corresponding to chronological events. Appliance data may also include the above-described owner private data that is accessible to a single owner (e.g., first owner private data), public data that is accessible to any entity, and owners private data that is accessible to select owners. An exemplary sequence of entries is shown in FIG. 4.

Exemplary types of data that may be included in appliance data 315 are described below.
Initial State Data
    Make
    Model
    Date of Manufacture
    Serial Number
Contract Data
    Warranties and service contracts
    Lease agreements
    Permissions for use
Usage Data
    Identification of entity that utilized appliance
    Information related to how appliance was utilized
Communication Data
    Identification of computer that communicated with appliance
    Information related to data received
    Information related to data sent
Error and Failure Data
    Failure history
    Service record
    Warranty claims
State Historical Data
    Log of values collected by sensors
Ownership Data
    Changes in ownership
    Provenance
Public Data
Owner manual
Specifications sheet
Marketing materials
Communications specifications
Object disposal data
Object metadata (e.g., types of data stored)

The data shown above is not a complete list of types of data that may be stored by appliance 301, but may serve as a representative sample. Additionally, the above listed public data include only examples of certain data that may be public data, since owners may determine and specify what data is public data. Embodiments of the invention do not place any constraints on data that may be stored and processed by appliance 301.

While embodiments of the invention do not require specific data syntax or semantics, it is advisable to standardize whenever possible. For example, much of data stored in appliance data 315 may be in human readable format. However, in some cases, data may be stored in machine readable format to make certain analysis of the data more efficient.

Further details related to the exemplary data above are provided. Regarding communication data, a current owner may, at any time, be able to identify all parties (e.g., individual or entity) utilizing appliance 301 and accessing appliance data 315. The current owner may also be able to identify what the individual or entity did with appliance 301 and what data they accessed. Regarding contract data, permission for use may assign and remove usage and access rights to specified individuals or organizations. Further, no access or usage of appliance 301 may be allowed without explicit owner permission. Additionally, it may be possible for the current owner to remove usage or access rights at any time.

First owner public key 311 may be a public key from a public-private key pair associated with a first owner of appliance 301. In some embodiments, the first owner may be a manufacturer and first owner public key 311 may be a manufacturer public key. After the first owner may acquire their public-private key pair, they may publish the public key from the public-private key pair and store a copy of the public key, first owner public key 311, securely within appliance 301. Appliance 301 may utilize first owner public key 311 to encrypt data in appliance data 315, such that only a first owner computer associated with the first owner may be able to decrypt the data utilizing their corresponding private key.

First owner shared secrets 312 may be one or more shared secrets associated with the first owner of appliance 301. The shared secrets may be symmetric keys. A first owner computer associated with the first owner may create one or more shared secrets unique to appliance 301 and store a copy of the shared secrets, first owner shared secrets 312, securely within appliance 301. The first owner computer may utilize the first owner shared secrets 312 to allow appliance 301 to encrypt data in appliance data 315 and control access to the encrypted data. For example, certain shared secrets from first owner shared secrets 312 may be provided to a subsequent owner of appliance 301 to enable the subsequent owner access to data encrypted by the provided shared secrets.

In an exemplary case, first owner shared secrets 312 may include a first symmetric key and a second symmetric key. The first owner computer may utilize the first symmetric key to encrypt data intended to be private to only the first owner of appliance 301 and may utilize the second symmetric key to encrypt data intended to be accessible to the first owner and subsequent owners of appliance 301. The first owner computer may provide the second symmetric key to a second owner computer associated with a second owner of appliance 301, giving the second owner computer the ability to decrypt the data encrypted utilizing the second symmetric key. Without the first symmetric key, the second owner computer cannot access the data private to only the first owner of appliance 301. At a later time, the second symmetric key may further be provided to another computer associated with a subsequent owner (e.g., a third owner) of appliance 301, giving the subsequent owner access to the data encrypted utilizing the second symmetric key. Hence, the distribution of first owner shared secrets 312 may control access to certain data in appliance data 315.

Appliance key pair 313 may be a public-private key pair associated with appliance 301. Appliance key pair 313 may be a unique key pair made up of a public key and a private key assigned to appliance 301. In some embodiments, the private key is securely stored within appliance 301, such as in a secure element. In some cases, the public key may be stored together with the private key or in a separate memory within appliance 301. The public key may also be made available through a public interface (e.g., appliance display, application accessible by another device, API etc.) supported by appliance 301. In some embodiments, appliance key pair 313 may be issued by the first owner computer associated with the first owner (e.g., manufacturer) of appliance 301. In other embodiments, appliance key pair 313 may be issued by a third party validator computer, so that the first owner may not possess appliance key pair 313. In some implementations, appliance 301 may digitally sign data in appliance data 315 of appliance key pair 313. For example, a digest (e.g., hash), including a timestamp and time zone, of appliance data 315 may be digitally signed using the private key of appliance key pair 313. This can ensure that any change in data already stored in appliance data 315 can be detected and thus the data cannot be inappropriately altered, for example, by a malicious party.

Subsequent owners shared secrets 314 may be one or more shared secrets associated with subsequent owners of appliance 301. The shared secrets may be symmetric keys. A computer associated with a subsequent owner may create one or more shared secrets unique to appliance 301 and store a copy of the shared secrets securely within appliance 301. Subsequent owners shared secrets 314 may include shared secrets associated with the second owner of appliance 301, as well as those associated with the third owner, a fourth owner, and any other succeeding owners of appliance. Each owner may utilize their shared secrets to encrypt data in appliance data 315 and control access to that encrypted data. For example, certain shared secrets from subsequent owners shared secrets 314 may be provided to an owner of appliance 301 to enable the owner to access data encrypted by the provided shared secrets. The method for controlling access may be similar to that described for first owner shared secrets 312, except that the shared secrets may be passed between owners that do not necessarily include the first owner of appliance 301.

In an exemplary case, subsequent owner shared secrets 314 may include a third symmetric key and a fourth symmetric key. The second owner computer may utilize the third symmetric key to encrypt data intended to be private to only the second owner of appliance 301 and may utilize the fourth symmetric key to encrypt data intended to be accessible to the second owner and subsequent owners of appliance 301. The second owner computer may provide the fourth symmetric key to a third owner computer associated with the third owner of appliance 301, giving the third owner computer the ability to decrypt the data encrypted utilizing the fourth symmetric key. Without the third symmetric key, the third owner computer cannot access the data private to only the second owner of appliance 301. At a later time, the fourth symmetric key may further be provided to another computer associated with a subsequent owner (e.g., a fourth owner) of appliance 301, giving the subsequent owner access to the data encrypted utilizing the fourth symmetric key.

As a result, the third owner computer may now have access to at least the second symmetric key, which can be utilized to decrypt data encrypted by the first owner computer and intended to be accessed by owners following the first owner, and the fourth symmetric key, which can be utilized to decrypt data encrypted by the second owner computer and intended to be accessed by owners following the second owner. A similar process may be utilized to distribute other shared secrets of subsequent owners shared secrets 314 associated with subsequent owners. Hence, the distribution of subsequent owner shared secrets 314 may control access to certain data in appliance data 315. Accordingly, there may be an ever increasing list of shared secrets, which can be utilized to decrypt data encrypted by previous owners, that may passed to each new owner of appliance 301.

While exemplary cases in which an owner computer is associated with two shared secrets is described above, embodiments are not so limited. For example, any owner may be associated with more than two shared secrets and may utilize each shared secret to encrypt different data. Any number of the shared secrets may then be distributed such that only appropriate entities can access certain data, as described above. In another example, an owner may be associated with a single shared secret because the owner may designate the same level of access to all their data (e.g., all data private to the owner, or all data private to subsequent owners, etc.). In some cases, an owner may use certain shared secrets originally associated with a previous owner to encrypt data. For example, a previous owner may have utilized a shared secret to encrypt owners private data stored while the previous owner held ownership of the appliance. The current owner may then utilize that same shared secret to encrypt additional owners private data stored in the appliance while the current owner holds ownership of the appliance. In a further example, an owner computer associated with an owner may not utilize any shared secret at all. This may occur when the owner designates all data to be public data, such that any encryption process for the data may not be needed.

State monitoring module 321 may, in conjunction with data processors 302, enable storage and management of data collected by state monitoring sensors 306. Based on owner preference, state monitoring module 321 may, with data processors 302, activate or deactivate certain sensors of state monitoring sensors 306, as well as facilitate certain sensors of state monitoring sensors 306 to either continuously or periodically collect data. The time intervals in which certain sensors periodically collect data can be designated (e.g., updated) by the current owner of appliance 301. Additionally, state monitoring module 321 may, with data processors 302, manage data collected by state monitoring sensors 306, such as by organizing the collected data stored by appliance 301. For example, the collected data may be stored by sensor type, time or day collected, or by other features. In some embodiments, state monitoring module 321, with data processors 302, may generate and store additional information related to the collected data, such as statistics related to the collected data (e.g., mean, median, maximum, minimum, etc.). Such statistics may be calculated based on all past collected data, as well as for certain time periods (e.g., over one hour, one day, one week, etc.). In some embodiments, state monitoring module 321 may, with data processors 302, store the collected data and the additional information in appliance data 315.

Encryption and decryption module 322 may, in conjunction with data processors 302, process encryption and decryption requests received by appliance 301. Encryption and decryption module 322 may, with data processors 302, support any suitable cryptographic techniques, such as those based on asymmetric encryption and symmetric encryption. Upon receiving an encryption or decryption request, encryption and decryption module 322 may, with data processors 302, determine at least whether the request is an encryption request or a decryption request, a requestor (e.g., owner) that sent the request, any key utilized to carry out an encryption or decryption process, and data to be encrypted or decrypted. Based on determined information, encryption and decryption module 322 may then, with data processors 302, carry out the encryption or decryption process utilizing the determined key to encrypt or decrypt data of appliance data 315. In some embodiments, the key may be first owner public key 311, a symmetric key of first owner shared secrets 312, a public or private key of appliance key pair 313, a symmetric key of subsequent owners shared secrets 314, and any other suitable encryption key related to appliance 301. In some cases, encryption and decryption module 322 may, with data processor 302, enable digital signing of data of appliance data 315.

Ownership transfer module 323 may, in conjunction with data processors 302, store and manage ownership transfer information related to changes in ownership of appliance 301. A transfer of ownership may occur between a current owner and a subsequent owner. When a transfer in ownership occurs, ownership transfer module 323 may receive, with data processors 302, information including identification of entities between which the transfer of ownership is being conducted, time of the transfer of ownership, and other related information. Ownership transfer module 323 may, with data processors 302, store the information in appliance data 315. In some embodiments, the current owner and subsequent owner may have a negotiation about the data that is to be made accessible to the subsequent owner as a result of the transfer of ownership.

Ownership transfer module 323 may enable, with data processors 302, the subsequent owner access to certain data designated by the current owner. For example, ownership transfer module 323 may, with data processor 302, enable a shared secret (e.g., a symmetric key of first owner shared secrets 312, etc.) to be provided to the subsequent owner upon request by the current owner, so that the subsequent owner can utilize the shared secret to decrypt certain data. In some implementations, ownership transfer module 323 may, with data processors 302, retrieve the shared secret and a nonce and send an encryption request to encryption and decryption module 322 to encrypt the shared secret and the nonce with the subsequent owner's public key. The encrypted data may then be stored in appliance data 315. In this way, only the subsequent owner, which possesses a corresponding private key, can decrypt the encrypted data and access the shared secret.

Additionally, ownership transfer module 323 may enable, with data processors 302, digital signing of ownership transfer data. For example, ownership transfer module 323 may enable, with data processors 302, the current owner and the subsequent owner to digitally sign ownership transfer data. Typically, there should not be a situation in which an appliance can be forged, as it is a real physical object that stores the ownership transfer data and will normally be in the physical possession of the current owner. However, in a case in which it is possible to duplicate (i.e. forge) an appliance, protection against such attacks may be utilized. For example, ownership transfer module 323 may enable, with data processors 302, a trusted third party to sign the ownership transfer data, so that the trusted third party may detect any changes and abnormalities in appliance data 315. In some cases, the trusted third party may keep their own record of the transfer of ownership.

Further, ownership transfer module 323 may ensure, with data processors 302, that data already stored in appliance 301 cannot be altered following the transfer of ownership. Ownership transfer module 323 may enable, with data processors 302, appliance 301 to digitally sign all previous data entries stored in appliance data 315. For example, ownership transfer module 323 may generate, with data processor 302, a hash of all the previous data entries and then digitally sign the generated hash. This may allow appliance 301 be able to detect any inappropriate alteration of the previous data entries at a later time, based on the digitally signed hash. Any digital signing by ownership transfer module 323 may be performed by communicating an encryption request to encryption and decryption module 322.

Data loss protection module 324 may, in conjunction with data processors 302, enable appliance 301 to be protected against data loss. While embodiments of the invention do not require data loss protection functionality, it is recommended that such capabilities be made available. Data loss protection module 324 may, with data processor 302, enable a service to retrieve data from appliance data 315 as stored and copy the data to one or more external storage devices for backup. Optionally, the backup data may be encrypted before being sent to the external storage devices. In this case, data loss protection module 324 may, with data processors 302, send an encryption request to encryption and decryption module 322 to encrypt the backup data. However, this may not be necessary as private data may typically already be encrypted within appliance 301.

FIG. 4 shows a block diagram 400 of exemplary data stored by an appliance according to embodiments of the invention. Block diagram 400 includes appliance data 415, which may comprise a plurality of data entries related to a series of events, the data entries stored in sequence based on the order in which the events occurred. Appliance data 415 may include initial owner data 410, initial state and identification data 411, first owner data 420 comprising public data 421, test and performance data 422, and storage and transit data 423. Appliance data 415 may also include first ownership transfer data 430 and second owner data 440 comprising storage and transit data 441 and contract data 442. Further, appliance data 415 may include second ownership transfer data 450 and third owner data 460 comprising storage and transit data 461 and contract data 462. Additionally, appliance data 415 may include third ownership transfer data 470, fourth owner data 480, and termination data 490.

The data shown in FIG. 4 is not a complete list of types of data that may be stored in appliance data 415, but may serve as a representative sample. Further, FIG. 4 shows only one exemplary sequence of events that may be associated with an appliance. For example, other sequences of events may be possible and thus entries may be stored in a different sequence than that shown in FIG. 4. Additional entries, such as digests (e.g., hashes), digital signatures, and other data that may be stored in appliance data 415 to ensure integrity and sequence of data may not be shown in FIG. 4 for simplicity. In some cases, an entry as shown in FIG. 4 may comprise one or more entries.

The first entry may be initial owner data 410, which may include information that establishes a first owner of the appliance. Initial owner data 410 may include identification of the first owner, as well as any relevant background information related to the first owner. In some embodiments, the first owner may be a manufacturer of the appliance and initial owner data 410 may comprise identification of the manufacturer and other details related to the manufacturer, such as location, year established, and size. In some embodiments, initial owner data 410 may include a digital signature by the first owner. In some cases, the digital signature may be externally verifiable (e.g., verification by a third party validator, such as a key certificate authority).

The second entry may be initial state and identification data 411, which may include information that classifies the appliance. Initial state and identification data 411 may include a make, a model, a serial number, or other related information of the appliance. In some embodiments, initial state and identification data 411 may include a digital signature by the first owner. In some cases, the digital signature may be externally verifiable (e.g., verification by a key certificate authority).

The next one or more entries may be first owner data 420, which may include any information added to appliance data 415 during ownership of the appliance by the first owner (e.g., manufacturer). In some cases, first owner data 420 may comprise public data 421, test and performance data 422, and storage and transit data 423. Public data 421 may be data available without restriction and may be made accessible by a public interface provided by the appliance. In some cases, public data 421 may include specification sheets, user manuals, communications specifications, marketing data, legal notices, notices of conformity to standards, warranty details, and object disposal data (e.g., recycling data, etc.). Test and performance data 422 may be data related to test results and detected performance. For example, test and performance data 422 may include calibration data, quality control data, and functional test data. In some cases, test and performance data 422 may be part of public data 421. Storage and transit data 423 may include data collected by sensors of the appliance, and may include temperature data, shock sensor data, location data, dates and times of arrival and departure, and other environmental data related to the appliance. In some cases, test and performance data 422 may be data private to the first owner and storage and transit data 423 may be data that the first owner chooses to share with a subsequent owner of the appliance. However, first owner data 420 may be any suitable combination of public data and private data.

The next entry may be first ownership transfer data 430, which may include any information related to a transfer of ownership that is conducted between the first owner and a second owner of the appliance. In some embodiments, the second owner may be a distributor of the appliance. First ownership transfer data 430 may include any information related to the transfer of ownership, such as identification information related to the first owner and the second owner, date and time of the transfer of ownership, as well as any information provided by the first owner to the second owner. In some embodiments, such information may include a shared secret, which may be encrypted, that can be utilized to access certain data in appliance data 415. For example, the shared secret may be a symmetric key that the first owner utilized to encrypt data, such as storage and transit data 423, and that the second owner may utilize to decrypt the encrypted data.

The next one or more entries may be second owner data 440, which may include any data added to appliance data 415 during ownership of the appliance by the second owner (e.g., distributor). In some cases, second owner data 440 may comprise storage and transit data 441 and contract data 442. Storage and transit data 441 may include data collected by sensors of the appliance, and may include temperature data, shock sensor data, location data, dates and times of arrival and departure, and other environmental data related to the appliance. Contract data 442 may include any contractual data related to the appliance and associated with the second owner. Second owner data 440 may be any suitable combination of public data and private data.

The next entry may be second ownership transfer data 450, which may include any information related to a transfer of ownership that is conducted between the second owner and a third owner of the appliance. In some embodiments, the third owner may be a merchant (e.g., retailer) of the appliance. Second ownership transfer data 450 may include any information related to the transfer of ownership, such as identification information related to the second owner and the third owner, date and time of the transfer of ownership, as well as any information provided by the second owner to the third owner. In some embodiments, such information may include a shared secret, which may be encrypted, that can be utilized to access certain data in appliance data 415. For example, the shared secret may be a symmetric key that the second owner utilized to encrypt data, such as storage and transit data 441, and that the third owner may utilize to decrypt the encrypted data.

The next one or more entries may be third owner data 460, which may include any data added to appliance data 415 during ownership of the appliance by the third owner (e.g., merchant). In some cases, third owner data 460 may comprise storage and transit data 461 and contract data 462. Storage and transit data 461 may include data collected by sensors of the appliance, and may include temperature data, shock sensor data, location data, dates and times of arrival and departure, and other environmental data related to the appliance. Contract data 462 may include any contractual data related to the appliance and associated with the third owner. In some cases contract data 462 may include consignment rules, return rules, and payment details. In some embodiments, contract data 462 may apply to collections of appliances and may not be stored in individual appliances. In this case, third owner data 460 may include an entry that assigns the appliance to a contractual group. Third owner data 460 may be any suitable combination of public data and private data.

The next entry may be third ownership transfer data 470, which may include any information related to a transfer of ownership that is conducted between the third owner and a fourth owner of the appliance. In some embodiments, the fourth owner may be a first user (also known as first consumer) of the appliance. Third ownership transfer data 470 may include any information related to the transfer of ownership, such as identification information related to the third owner and the fourth owner, date and time of the transfer of ownership, as well as any information provided by the third owner to the fourth owner. In some embodiments, such information may include a shared secret, which may be encrypted, that can be utilized to access certain data in appliance data 415. For example, the shared secret may be a symmetric key that the third owner utilized to encrypt data, such as storage and transit data 461, and that the fourth owner may utilize to decrypt the encrypted data.

The next one or more entries may be fourth owner data 480, which may include any data added to appliance data 415 during ownership of the appliance by the fourth owner (e.g., first user). In some cases, fourth owner data 480 may include activation entries (e.g., enabling and/or disabling the appliance), contract entries (e.g., loan/lease details), usage data (e.g., hours of use), state data (e.g., sensor data, etc.), fault data, permission data (e.g., permission information for other to utilize the appliance), communications data, event data (e.g., sales receipts, warranty claims, recalls, etc.). Fourth owner data 480 may any suitable combination of public data and private data.

In some embodiments, the appliance may be transferred (e.g., sold) to subsequent owners after the fourth owner. This may result in additional entries including ownership transfer data and owner data related to the subsequent owners, similar to the data described above, to be stored in appliance data 415 in sequence following fourth owner data 480. A final owner of the appliance may add or cause the appliance to store termination data to appliance data 415. In some cases, the fourth owner may be the final owner of the appliance.

The final entry may be termination data 490, which may include information related to the end of the lifecycle for the appliance. In some embodiments, termination data 490 may include ownership transfer data related to a change of ownership to a recycler. Termination data 490 may specify that the appliance may not be resold or subsequently utilized. For example, in an exemplary scenario in which the appliance may be a vehicle, and termination data 490 may include "write-off" information for the vehicle.

Figure 5:
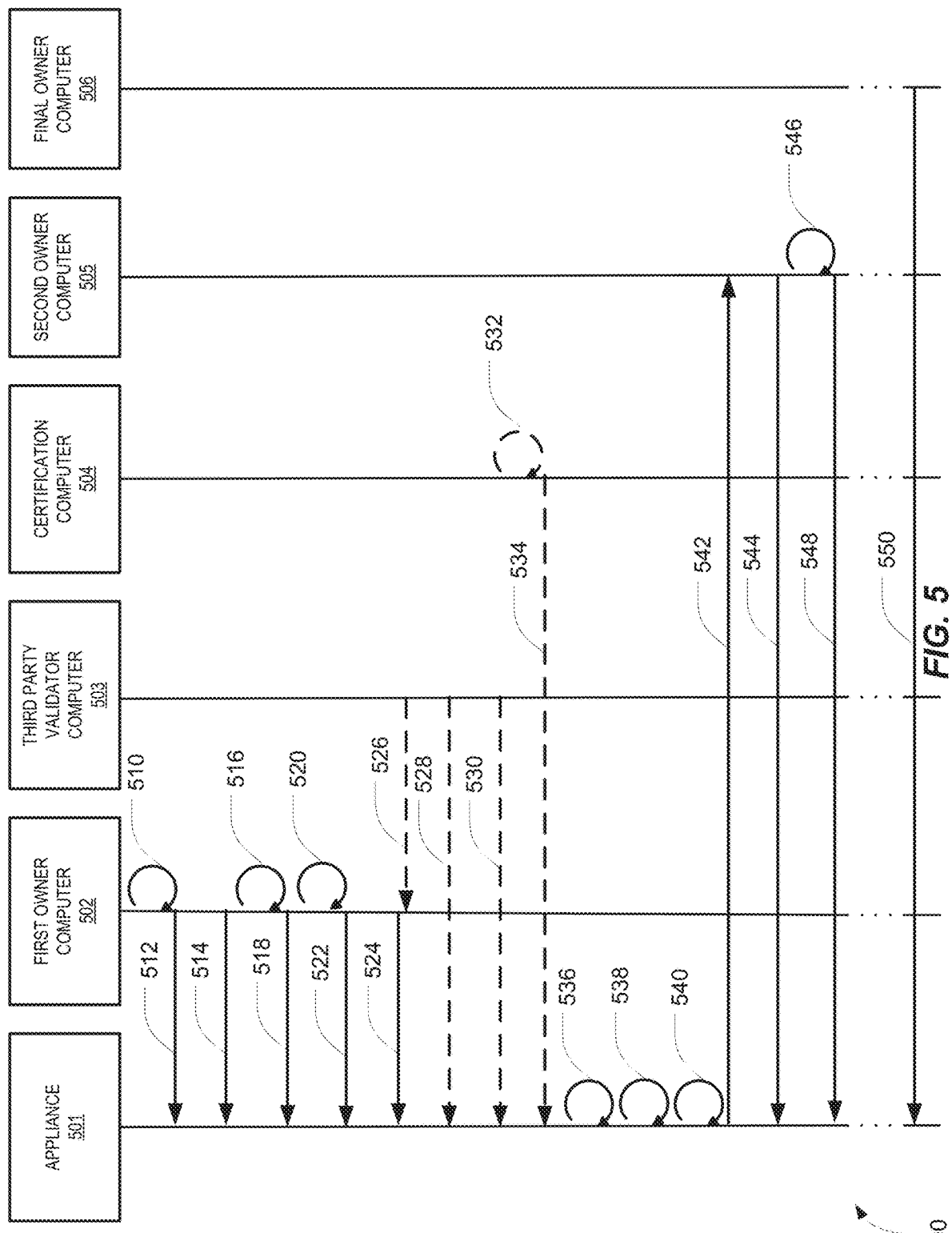
FIG. 5 shows an exemplary flow diagram according to embodiments of the invention.

FIG. 5 shows an exemplary flow diagram 500 for describing how data entries for appliance data stored in an appliance are created and utilized according to embodiments of the invention. FIG. 5 includes an appliance 501, a first owner computer 502, a third party validator computer 503, a certification computer 504, a second owner computer 505, and a final owner computer 506. The computing devices described in FIG. 5 may be in communication by a suitable communications network. Any of the computing devices may be capable of receiving data from appliance 501, sending data to appliance 501, encrypting data, and signing data. The flow diagram 500 may be described with respect to FIG. 6 through FIG. 12.

Any steps involving storage of data (e.g., adding data) in appliance 501 may comprise storing the data in appliance data of appliance 501. The data may be stored in strict sequence, such that event occurrences corresponding to data included in the appliance data may take place in the order that the corresponding data is stored. In some embodiments, data may be stored in different ways. For example, certain data may be pre-classified by the owner of appliance 501 as public or private (e.g., to a specific owner or to subsequent owners), such that the data can be encrypted based on its corresponding classification prior to being stored in appliance 501. In other embodiments, an owner may classify data as public or private at the time of a transfer of ownership of the appliance, and thus the data may be encrypted prior to the transfer of ownership being completed.

Any suitable mechanism may be utilized to generate encryption keys. For example, any key pairs described herein may be acquired by any suitable key acquisition mechanism or infrastructure (e.g., public key infrastructure (PKI)). In some embodiments, shared secrets (e.g., symmetric keys) may be generated using external software that may be run on owner computers and may be sent securely to appliance 501.

At step 510, first owner computer 502 may acquire a first owner key pair. In some embodiments, first owner computer 502 may be a manufacturer computer and the first owner key pair may be a manufacturer key pair. The first owner key pair may be associated with first owner computer 502. In some embodiments, the first owner key pair may include a first owner public key and a first owner private key.

At step 512, first owner computer 502 may provide an instruction to the appliance 501 to store a copy of the first owner public key securely within appliance 501, such as in a secure element. The first owner public key may be published publicly by first owner computer 502, such that any entity may access the public key.

At step 514, an appliance key pair may be assigned to appliance 501. The appliance public key pair may be a unique key pair, which may include an appliance public key and an appliance private key. In some embodiments, the appliance key pair may be issued by first owner computer 502 associated with the first owner (e.g., manufacturer) of appliance 501. The appliance private key may be securely stored within appliance 501, such as in a secure element. The appliance public key may be made available through an interface supported by appliance 501.

Ideally, the only copy of the appliance private key may be stored by appliance 501. However, in some cases, this situation cannot be assumed as the chip supplier or the first owner of appliance 501 may know the appliance private key. In cases in which keys may be built into a secure element by a chip manufacturer, there may be a high level of trust, but no guarantee that the appliance private key is only known by appliance 501.

Hence, there may be other ways to assign the appliance key pair. For example, instead of the first owner computer 502 issuing the appliance key pair, a trusted third party, such as that associated with third party validator computer 503, may issue the appliance key. This may enable the appliance key pair to be known only to appliance 501 and third party validator computer 503. This may avoid any potential risk that may arise with the first owner having knowledge of the appliance private key.

At step 516, first owner computer 502 may generate two shared secrets (e.g., symmetric keys) unique to appliance 501. The two shared secrets may include a first shared secret and a second shared secret. In some embodiments, the first shared secret may be utilized to encrypt data that is and always will be private to the first owner and the second shared secret may be utilized to encrypt data that is private to the first owner and that will be made available to subsequent owners by providing them with a copy of the second shared secret.

At step 518, first owner computer 502 may send the shared secrets to appliance 501, which may store a copy of the first shared secret and the second shared secret. There are several ways in which the two shared secrets may be sent to appliance 501. In one case, the shared secrets may be sent to appliance 501 by an out-of-band channel. For example, the shared secrets may be entered manually by the first owner into appliance 501 (e.g., by keying in code using input elements of appliance 501). In another case, the two shared secrets may be encrypted using the public key of appliance 501 and then sent to appliance 501. The two shared secrets may be stored securely within appliance 501, such as in a secure element.

At step 520, first owner computer 502 may generate initial state data related to appliance 501. In some embodiments, the initial state data may include public data, which may include user manuals and marketing data, and private data, which may include manufacturing details.

At step 522, first owner computer 502 may generate and send an instruction to cause appliance 501 to store the initial state data within appliance 501. In some embodiments, the public data of the initial state data (e.g., manuals, marketing data, etc.) may be stored unencrypted and the private data of the initial state data (e.g., test data for quality control) may be stored encrypted. In some implementations, all or portions of the private data may be encrypted utilizing the first shared secret and the second shared secret, depending on whether data will be made available to subsequent owners of appliance 501. For example, as described above, the first shared secret may be utilized to encrypt data that is and always will be private to the first owner and the second shared secret may be utilized to encrypt data that is private to the first owner and that will be made available to subsequent owners by providing them with a copy of the second shared secret.

At step 524, the first owner computer 502 may generate and transmit an instruction to cause the appliance 501 to store an entry to ensure strict sequence of stored data in appliance 501. In some implementations, the first owner computer 502 may add a random nonce to the initial state data, hash the combined initial state data and the random nonce, and digitally sign the resulting hash utilizing the appliance private key. Subsequently, first owner computer 502 may store a copy of the digitally signed hash in appliance 501. In some embodiments, the first owner may choose to publish the signature to a trusted third party, such as third party validator computer 503, which may then verify at a later time that the data in appliance 501 has not been altered by first owner computer 502. This is typically an optional additional verification method, since data associated with the first owner may already be "locked" when a transfer in ownership occurs.

It is preferable that a nonce is utilized as described above for future entries similar to that created in step 524. The nonce may be a random element that can ensure that the same data does not encrypt to the same result more than once. It is also preferred that a timestamp and time zone are included in all hashes. All additional entries in the appliance data that are generated by creating a hash and digitally signing the hash may include a copy of the previously generated hash to ensure strict sequence of the data stored in the appliance data.

Figure 6:
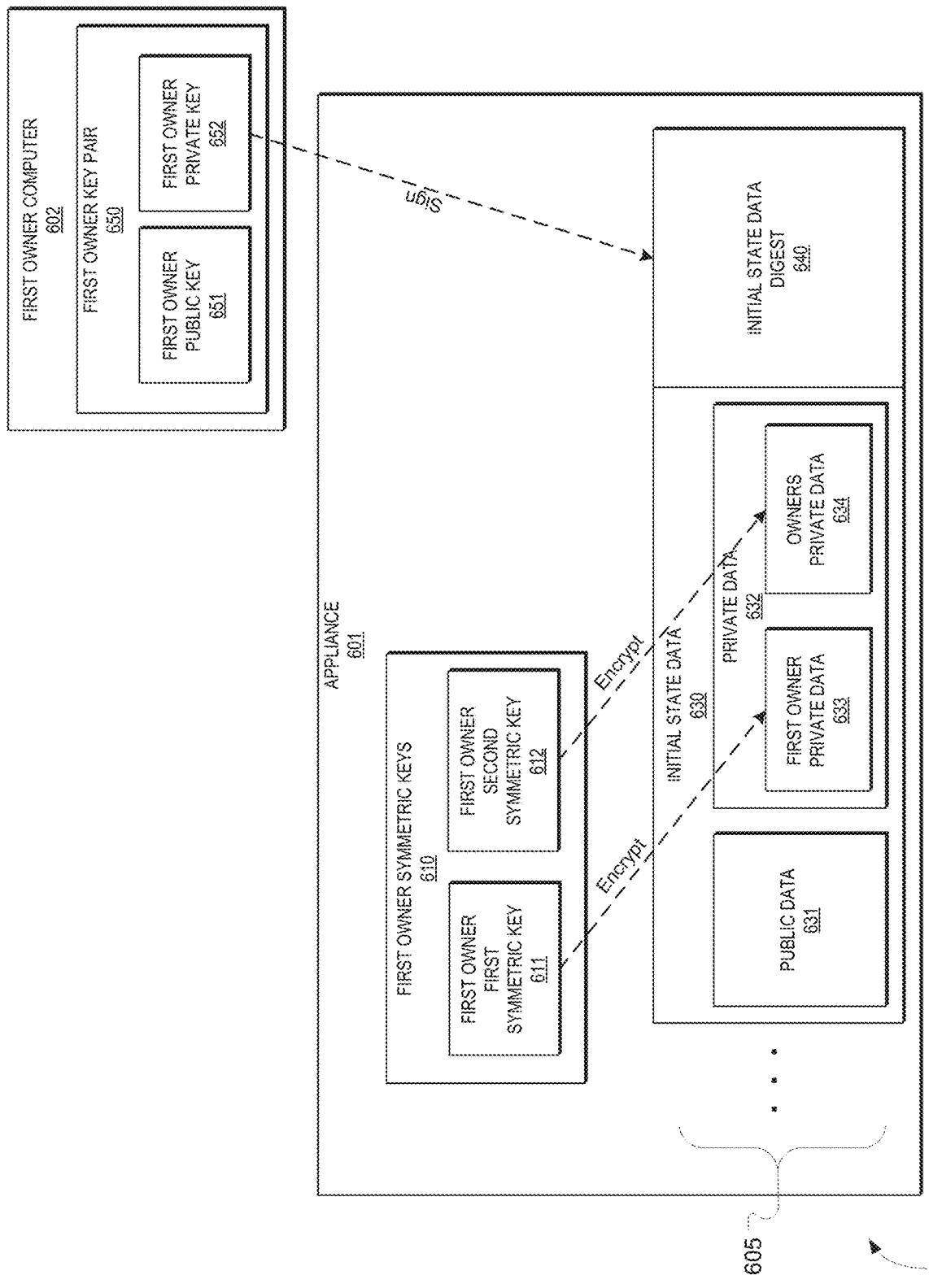
FIG. 6 shows an exemplary block diagram of encryption of initial state data in an appliance according to embodiments of the invention.

Steps 522 and 524 may be described in more detail using FIG. 6, which shows an exemplary block diagram 600 of initial state data and related information in an appliance according to embodiments of the invention. FIG. 6 includes an appliance 601 including appliance data 605 and a first owner computer 602. While not shown in FIG. 6, one or more elements described in FIG. 6 may be stored in a secure element of appliance 601. In the example shown in FIG. 6, the shared secrets associated with the first owner may be symmetric keys.

Appliance 601 may comprise first owner symmetric keys 610 including first owner first symmetric key 611 and first owner second symmetric key 612. Appliance 601 may also include appliance data 605 comprising initial state data 630 including public data 631 and private data 632, which may include first owner private data 633 and owners private data 634, and initial state data digest 640. First owner computer 602 may comprise a first owner key pair 650, which may include a first owner public key 651 and a first owner private key 652.

As described above, the shared secrets (e.g., symmetric keys) associated with the first owner of appliance 601 may be utilized to encrypt certain data of initial state data 630. For example, first owner private data 633 may be encrypted utilizing first owner first symmetric key 611 and owners private data 634 may be encrypted utilizing first owner second symmetric key 612. The first owner first symmetric key 611 may be known only to the first owner and appliance 601, so that no other subsequent owners of appliance 601 may decrypt and access the first owner private data 633. However, the first owner second symmetric key 612 may be provided to subsequent owners of appliance 601, so that the subsequent owners may utilize the first owner second symmetric key 612 to decrypt and access owners private data 634. Public data 631 may not be encrypted at all, since it is available without restriction.

Additionally, initial state data digest 640 may be digitally signed by first owner computer 602 utilizing the first owner private key 652. The initial state data digest 640 may be a hash of initial state data 630. In some cases, the initial state data digest 640 may be a hash of initial state data 630 and a random nonce. In some implementations, the initial state data digest 640 may further include a timestamp and a time zone relevant to the time that the hash was generated. This signed digest may ensure that appliance data 605 may not be inappropriately altered after its generation. For example, verification that initial state data 630 was not altered can be conducted by decrypting, utilizing first owner public key 651, encrypted initial state data digest 640 and calculating the hash of initial state data 630. If the results of decryption and the result of the hash are equal, it can be verified that initial state data 630 has not been tampered with.

At steps 526 and 528, a third party validator computer 503 may verify first owner computer 502 to prevent forgeries. These are optional steps. At step 526, the third party validator computer 503 may retrieve the first owner public key, which may be accessible without restriction. At step 528, third party validator computer 503 may generate and send an instruction to cause the appliance 501 to store a new entry in the appliance data of appliance 501. The third party validator computer 503 may add a timestamp and the first owner public key to the hash of appliance data 605 and digitally sign the result with a private key associated with third party validator computer 503. Subsequently, third party validator computer 503 may store the signed result in the entry within appliance 501. This may provide a record of appliance data 605 stored at this point in time so that any unexpected changes to appliance data 605 may be detected.

At step 530, if certification is performed for appliance 501, third party validator computer 503 may add certification data to the appliance data of appliance 501. This is an optional step. Typically, the certification data may be public data that is made accessible without restriction. Certification entities, such UL and FCC, may provide the certification.

At steps 532 and 534, certification computer 504 associated with a certification entity may generate and provide an instruction to the appliance 501 to store an entry in appliance 501. These are optional steps. At step 532, certification computer 504 may retrieve a certification computer private key. At step 534, certification computer 504 may combine (e.g., concatenate) the certification data from step 530 plus the previous hash and a timestamp, generate a hash of the combined data, and then digitally sign the generated hash using their certification computer private key retrieved in step 532. The result may be stored in an entry in appliance data 605. This existence of the entry may show a subsequent owner that a suitable certification entity verified the certification data stored in appliance 501.

In some embodiments, certification data may be signed for an individual appliance by the certification computer 504, as described in steps 532 and 534. However, in other embodiments, individual signing of each appliance may not be necessary. For example, certification computer 504 may sign a certification for a group of appliances that includes Make, Model, Serial Number range, and date range associated with the group of appliances. The certification may be signed by the manufacturer computer and included in the individual appliances that are covered by the certification. In some embodiments, details of the "group" certification may be stored by each appliance or in an external storage.

It is understood that there are other suitable trusted entities that may verify and sign data in appliance 501 other than certification entities. For example, in some cases, appliance 501 may store valuation data associated with appliance 501. To show a subsequent owner of appliance 501 that the valuation is valid, a trusted third party, such as a valuation entity computer, may verify and sign the valuation data.

At step 536, appliance 501 may actively monitor its own state and store state monitoring data within appliance 501. At this point, the state monitoring capability of appliance 501 may be activated. In some cases, this may correspond to the point at which appliance 501 the state monitoring capability is turned on manually by the owner of appliance 501 or when appliance 501 is installed with battery power or connected to another power source. State monitoring data may include shock data and temperature data, which may provide information related to conditions under which appliance 501 may be stored or utilized. This information may be useful to check whether a certain storage temperature is exceeded or whether appliance 501 has been dropped or damaged. In some embodiments, the public data of the state monitoring data may be stored unencrypted and the private data of the state monitoring data may be stored encrypted. In some implementations, the private data may be encrypted utilizing the first shared secret and the second shared secret associated with first owner computer 502, depending on whether data will be made available to subsequent owners of appliance 501.

At step 538, appliance 501 may generate and store an entry to ensure strict sequence of stored data in appliance 501. In some implementations, appliance 501 may combine (e.g., concatenate) the previous hash and a timestamp to the state monitoring data collected in step 528, generate a hash of the combined data, and digitally sign the generated hash utilizing the appliance private key. Subsequently, appliance 501 may store a copy of the digitally signed hash. This stored data may be intended to prevent an entity from altering data (e.g., state monitoring data) once stored in appliance 501.

However, in some embodiments, first owner computer 502 may know the appliance private key. For example, first owner computer 502 may be associated with the first owner of appliance 501, which may be the manufacturer of appliance 501. The manufacturer of appliance 501 may come to know the appliance private key during creation of appliance 501. In this case, there may be a potential risk as the first owner computer 502 may be able to alter data already stored by appliance 501. It is noted that the scope of change to stored data may be limited back to the previous digital signature stored by third party validator computer 503.

A number of techniques can be utilized to limit or prevent altering of data by first owner computer 503, which may know the appliance private key. For example, hashes of data corresponding to individual events stored by appliance 501 may be digitally signed by one or more third party validator computers associated with one or more trusted third parties. In another example, the latest generated hash of the appliance data stored by appliance 501 may be digitally signed by one or more third party validator computers associated with one or more trusted third parties. In another example, hashes stored by appliance 501 may be published, either individually or periodically to an external storage (e.g., distributed database) that may be verified in a separate process supported by the external storage. Such published entries may be linked back to appliance 501 by any suitable identifier. While the above techniques may be useful to limit or prevents changes of stored data in appliance 501, they are not required for embodiments of the invention.

Additionally, certain techniques can be utilized to provide protection against data loss. For example, any data stored in the appliance data of appliance 501 may be exported to an external storage (e.g., distributed database or ledger). This export of data may be conducted incrementally, partially, or periodically. In some embodiments, certain subsections of data stored by appliance 501 may be selected to be externally stored. Typically, no further encryption of data stored by appliance 501 may be required when sending the data to an external store, since any private data may already be encrypted. However, certain data, such as any shared secrets (e.g., first owner first shared secret, first owner second shared secret, etc.) may be stored separately (e.g., not in the external storage) in a secure location by the party or parties sharing the shared secrets, since the shared secrets may enable decryption of the exported data.

Figure 7:
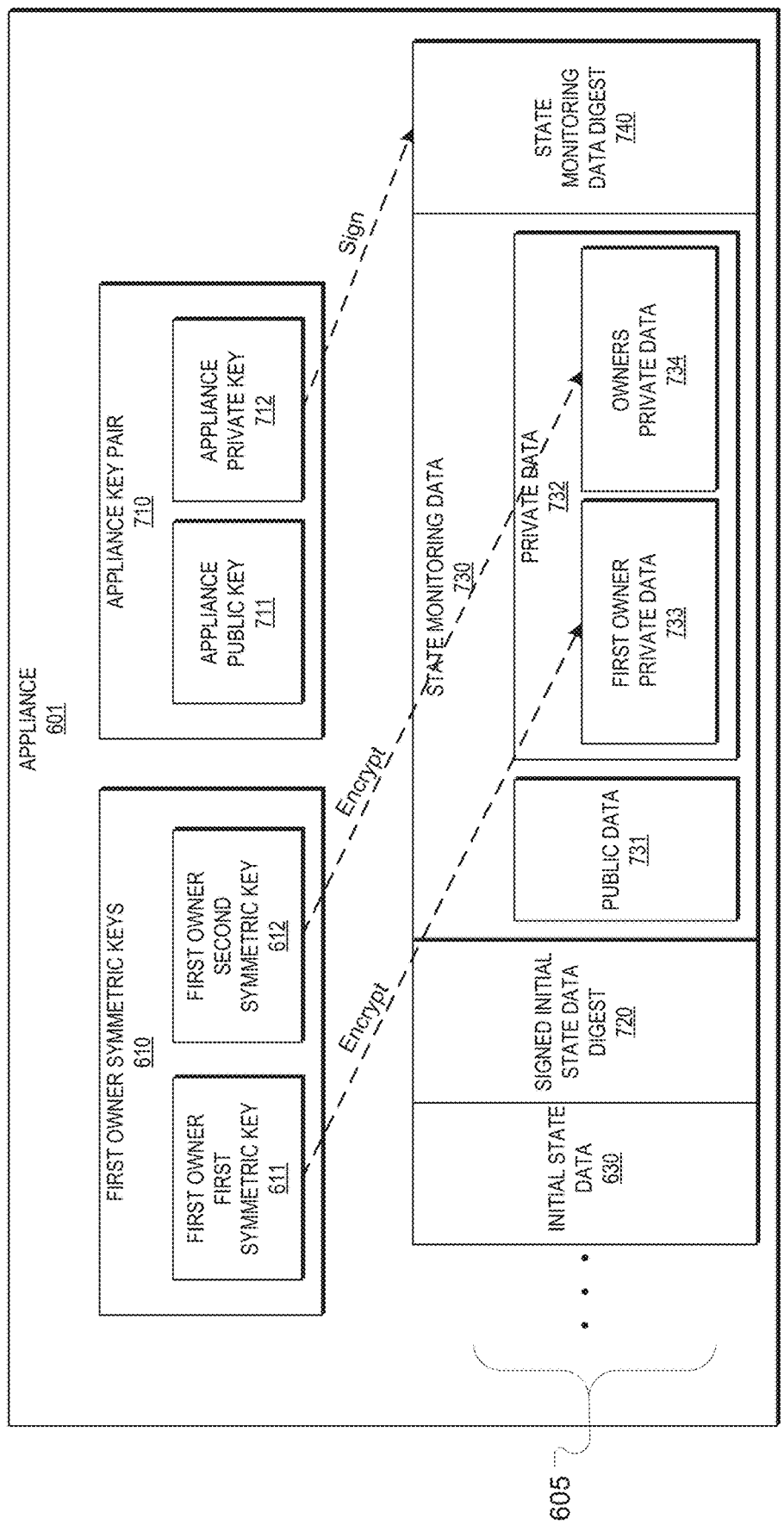
FIG. 7 shows an exemplary block diagram of encryption of state monitoring data in an appliance according to embodiments of the invention.

Steps 536 and 538 may be described in more detail using FIG. 7, which shows an exemplary block diagram 700 of state monitoring data associated with a first owner in appliance 601 according to embodiments of the invention. As described in FIG. 6, appliance 601 may comprise first owner symmetric keys 610 including first owner first symmetric key 611 and first owner second symmetric key 612. Appliance 601 may also include appliance data comprising initial state data 630. While not shown in FIG. 7, one or more elements described in FIG. 7 may be stored in a secure element of appliance 601.

Additionally, FIG. 7 also shows appliance 601 comprising appliance key pair 710 including an appliance public key 711 and an appliance private key 712. Appliance data 605 of appliance 601 also includes signed initial state data digest 720, which is initial state data digest 640 signed by first owner computer 603 in FIG. 6. The appliance data may also comprise state monitoring data 730 comprising public data 731 and private data 732, which includes first owner private data 733 and owners private data 734. Appliance data 605 may also include state monitoring data digest 740.

As described above, the shared secrets (e.g., symmetric keys) associated with the first owner of appliance 601 may be utilized to encrypt certain data of state monitoring data 730. For example, first owner private data 733 may be encrypted utilizing first owner first symmetric key 611 and owners private data 734 may be encrypted utilizing first owner second symmetric key 612. The first owner first symmetric key 611 may be known only to the first owner and appliance 601, so that no other subsequent owners of appliance 601 may decrypt and access the first owner private data 733. However, the first owner second symmetric key 612 may be provided to subsequent owners of appliance 601, so that the subsequent owners may utilize the first owner second symmetric key 612 to decrypt and access the owners private data 734. Public data 731 may not be encrypted at all, since it is available without restriction.

Additionally, state monitoring data digest 740 may be digitally signed by appliance 601 using the appliance private key 712. The state monitoring data digest 740 may be a hash of state monitoring data 730. In some cases, the state monitoring data digest 740 may be a hash of state monitoring data 730 and a random nonce. In some implementations, the state monitoring data digest 740 may further include a timestamp and a time zone relevant to the time that the hash was generated. This signed digest may ensure that state monitoring data 730 may not be inappropriately altered after its generation.

At step 540, a transfer in ownership may be initiated and an entry comprising ownership transfer data may be added to the appliance data of appliance 501. The transfer in ownership may be conducted from the first owner of appliance 501 to a second owner of appliance 501. The second owner may be associated with second owner computer 505. In some embodiments, the second owner may be a distributor and second owner computer 505 may be a distributor computer. The ownership transfer entry may be digitally signed by both first owner computer 502 and second owner computer 505. It is recommended that if appliance 501 is of high value that either a trusted third party computer, such as third party validator computer 503, verifies and signs the ownership transfer data, or an external storage is utilized to register a digest (e.g., hash). In some cases, the transfer in ownership may be verified by third party validator computer 503, using a method similar to that described in previous steps 526 and 528.

At step 542, the transfer in ownership may comprise enabling second owner computer 505 to access certain data by providing a shared secret (e.g., symmetric key) to second owner computer 505. For example, first owner computer 502 may provide a shared secret that may be utilized to decrypt the data by second owner computer 505. As described above, in some embodiments, the first shared secret may be utilized to encrypt data that is and always will be private to the first owner and the second shared secret may be utilized to encrypt data that is private to the first owner and that will be made available to subsequent owners by providing them with a copy of the second shared secret. Hence, the transfer in ownership may involve sending the second shared secret to second owner computer 505.

However, to ensure that the shared secret is communicated securely, the shared secret may be encrypted before being transmitted. In some embodiments, first owner computer 502 may encrypt, using a public key associated with second owner computer 505, the second shared secret with a nonce. The encrypted result may be stored in the ownership transfer data within appliance 501.

At step 544, second owner computer 505 may decrypt the encrypted result using a corresponding private key associated with second owner computer 505. Accordingly, second owner computer 505 may retrieve the second shared secret. Second owner computer 505 may now be capable of accessing data stored in appliance 501 that can be decrypted utilizing the second shared secret.

Figure 8:
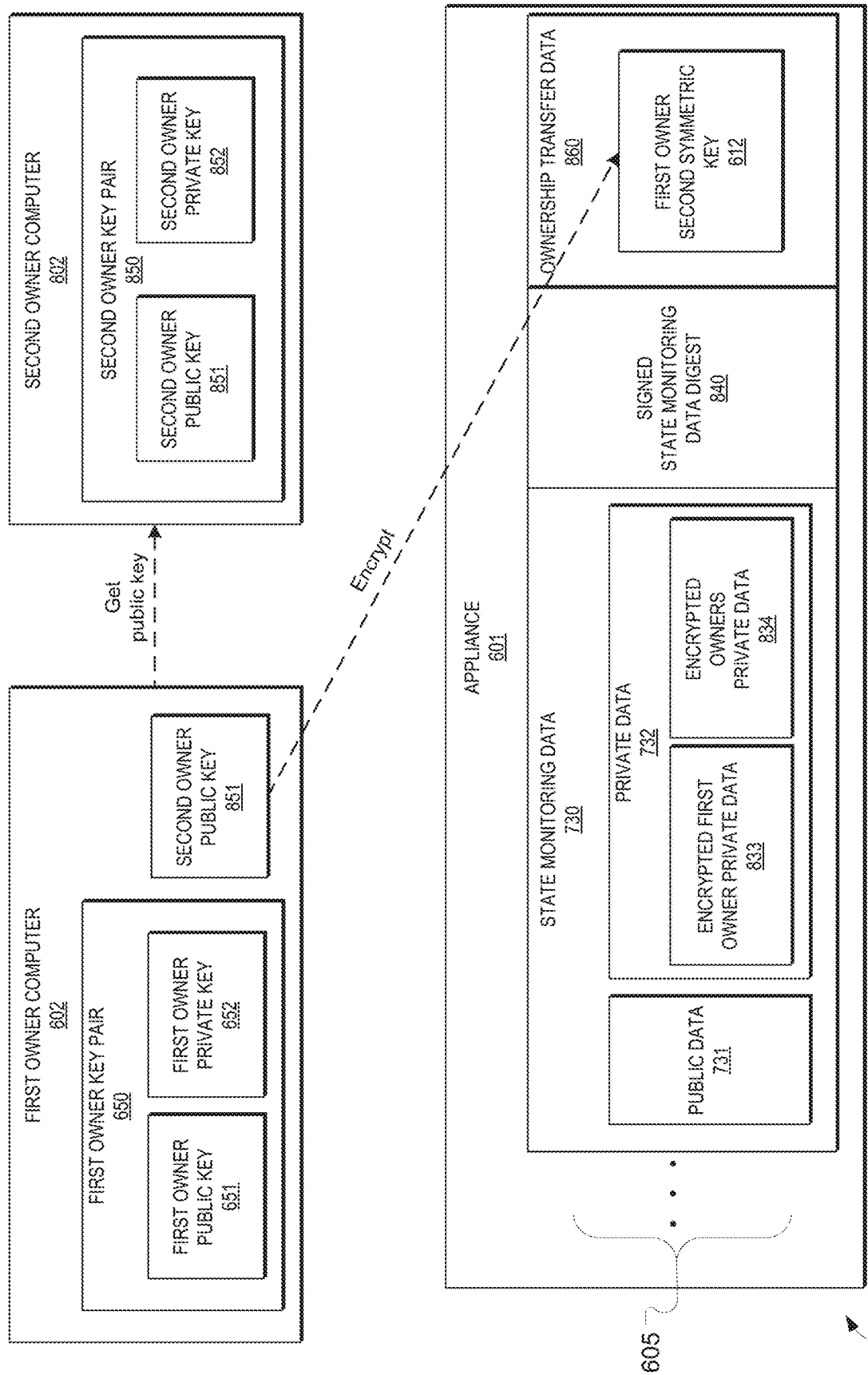
FIG. 8 shows an exemplary block diagram for an encryption process for a transfer in ownership of an appliance according to embodiments of the invention.
Figure 9:
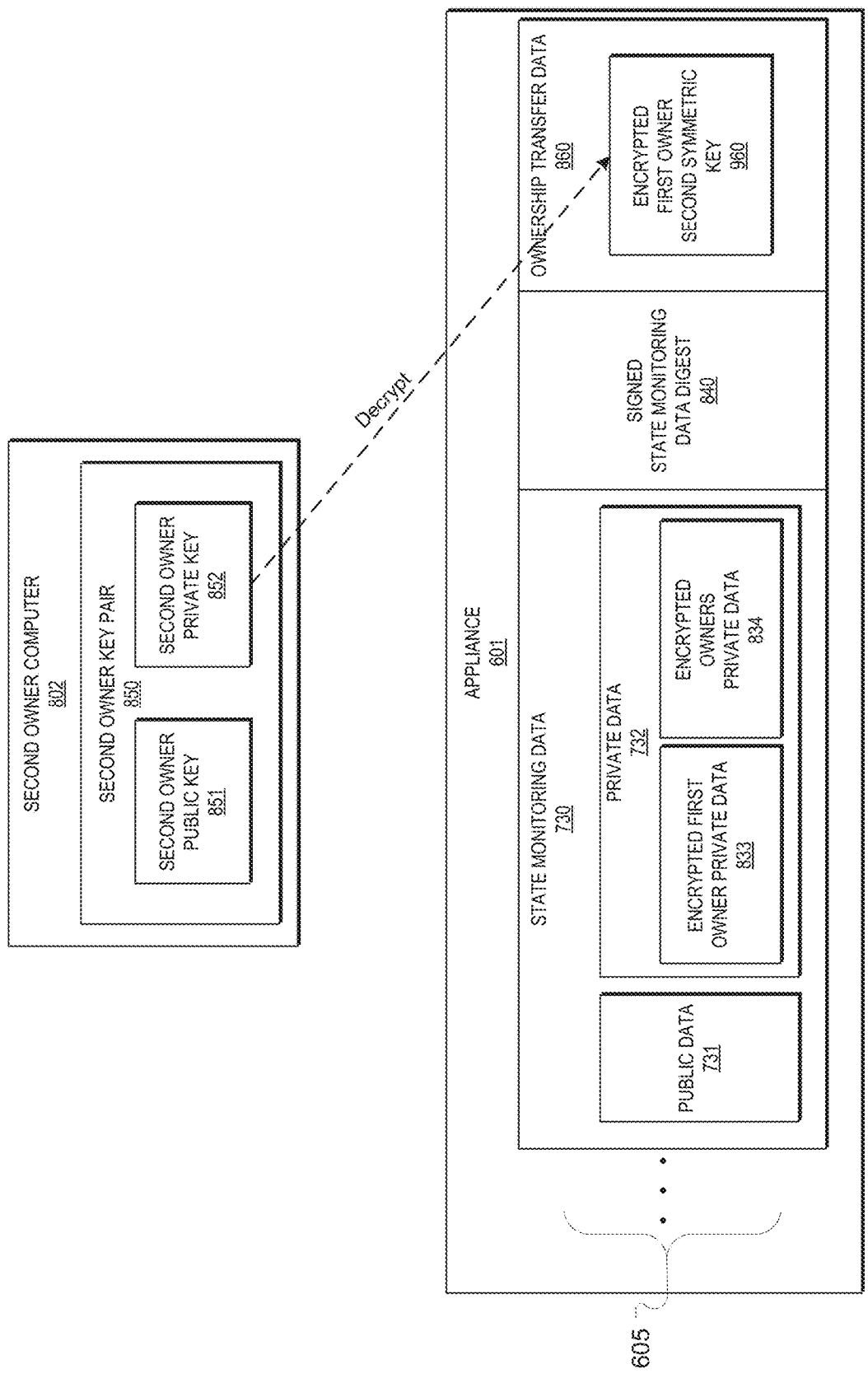
FIG. 9 shows an exemplary block diagram for a decryption process for the transfer of ownership of an appliance according to embodiments of the invention.
Figure 10:
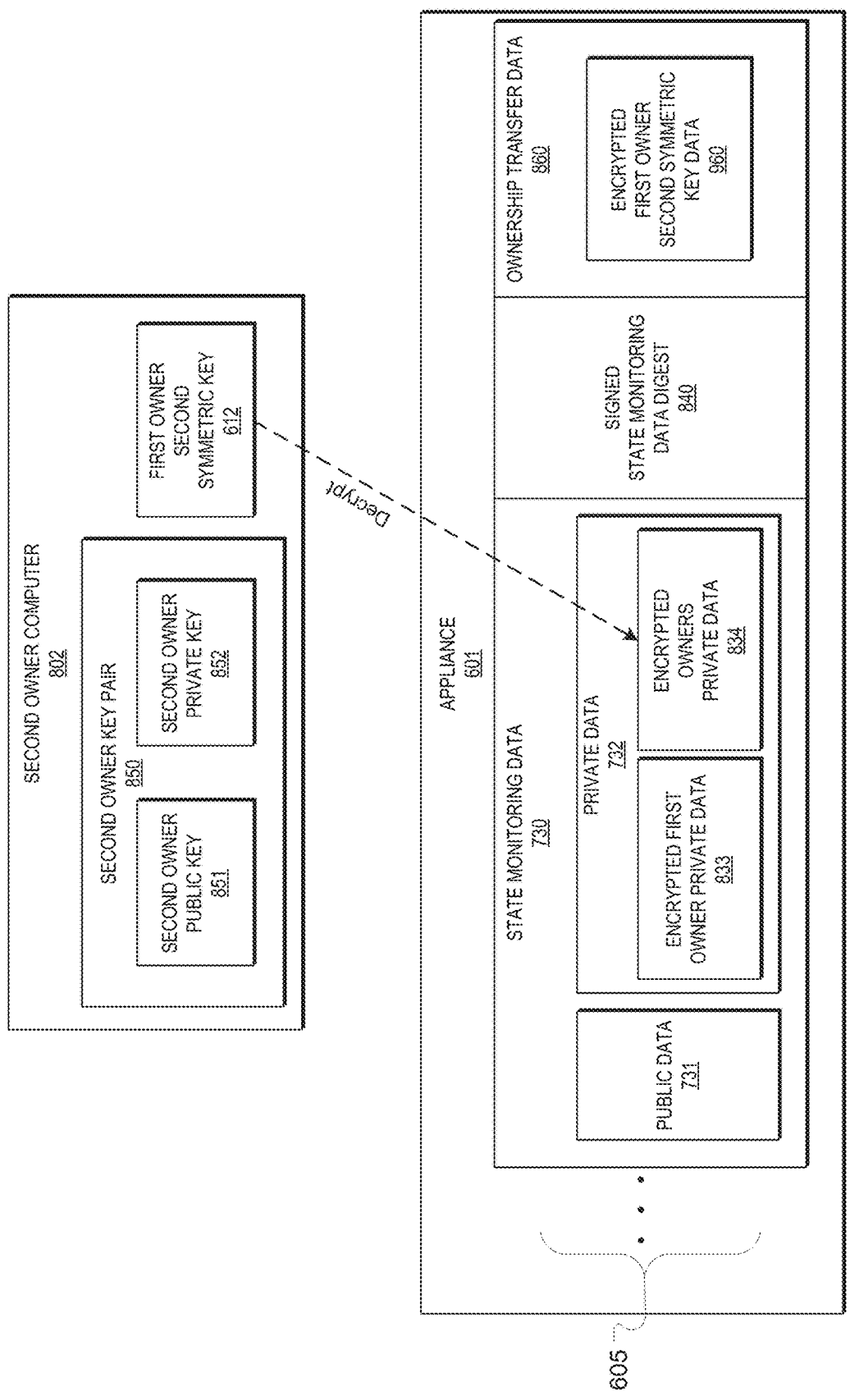
FIG. 10 shows an exemplary block diagram for a decryption process after a transfer of ownership according to embodiments of the invention.

The transfer of ownership of steps 540 through 544 may be described in more detail using FIG. 8 through FIG. 10. The descriptions of FIG. 8 through FIG. 10 may reference elements of FIG. 6 and FIG. 7.

FIG. 8 shows an exemplary block diagram 800 for an encryption process for a transfer in ownership of appliance 601 according to embodiments of the invention. FIG. 8 includes first owner computer 602 comprising first owner key pair 650 and second owner public key 851. First owner key pair 650 includes first owner public key 651 and first owner private key 652. FIG. 8 also includes a second owner computer 802 comprising a second owner key pair 850, which includes a second owner public key 851 and a second owner private key 852. While not shown in FIG. 8, one or more elements described in FIG. 8 may be stored in a secure element of appliance 601.

Appliance 601 comprises appliance data 605. Appliance data 605 may comprise state monitoring data 730, which may include public data 731 and private data 732. Private data 732 may include encrypted first owner private data 833 and encrypted owners private data 834. Encrypted first owner private data 833 may be first owner private data 733 encrypted using first owner first symmetric key 611 as shown in FIG. 7. Encrypted owners private data 834 may be owners private data 734 encrypted using first owner second symmetric key 612 as shown in FIG. 7. Appliance data 605 may further include signed state monitoring data digest 840, which may be state monitoring data digest 740 digitally signed using appliance private key 712 as shown in FIG. 7. Appliance data 605 may further include ownership transfer data 860, which may include first owner second symmetric key 612. In some embodiments, ownership transfer data 860 may be signed by both first owner computer 602 and second owner computer 802.

A transfer of ownership of appliance 601 may take place between the first owner of appliance 601 associated with first owner computer 602 and the second owner of appliance 601 associated with second owner computer 802. Upon initiation of the transfer of ownership, ownership transfer data 860 may be added to appliance data 605. Ownership transfer data 860 may include any information related to the ownership transfer (e.g., date and time, entities involved, etc.).

The transfer in ownership may comprise providing second owner computer 602 access to certain private data stored in appliance 601. For example, such data may be encrypted owners private data 834. As described above, encrypted owners private data 834 may be owners private data 734 encrypted using first owner second symmetric key 612 (see FIG. 7). Hence, in order for second owner computer 602 to access owners private data 734, second owner computer 602 may obtain first owner second symmetric key 612. While first owner second symmetric key 612 could be directly passed to second owner computer 602, there are other ways to accomplish a similar result. A secure way to provide second owner computer 602 with the first owner second symmetric key 612 is described herein.

Ownership transfer data 860 may further include first owner second symmetric key 612. However, to ensure that the first owner second symmetric key 612 can only be retrieved by second owner computer 802, first owner computer 602 may encrypt first owner symmetric key 612 before storing it in ownership transfer data 850. For example, first owner computer 602 may retrieve second owner public key 851 associated with second owner computer 802. In some embodiments, second owner computer 802 may publish second owner public key 851 so that it is accessible to first owner computer 602. In other embodiments, first owner computer 602 may request second owner computer 802 for second owner public key 851. Subsequently, first owner computer 602 may utilize second owner public key 851 to encrypt first owner second symmetric key 612 in ownership transfer data 860 and store the encrypted result in appliance data 605. In some embodiments, first owner computer 602 may combine (e.g., concatenate) first owner second symmetric key 612 with a nonce and encrypt the combined result.

FIG. 9 shows an exemplary block diagram 900 for a decryption process for the transfer of ownership of appliance 601 according to embodiments of the invention. FIG. 9 includes elements similar to those shown in FIG. 8. In addition, FIG. 9 may include encrypted first owner second symmetric key 960, which may be the result of first owner second symmetric key 612 encrypted utilizing second owner public key 851 (see FIG. 8).

Second owner computer 802 may utilize second owner private key 852 to decrypt encrypted first owner second symmetric key 960. Since only second owner computer 802 possesses second owner private key 852 corresponding to second owner public key 851, this may ensure that only second owner computer 802 can carry out the decryption process.

FIG. 10 shows an exemplary block diagram 1000 for a decryption process for accessing private data after the transfer of ownership according to embodiments of the invention. FIG. 10 includes elements similar to those shown in FIG. 9. Appliance data 605 includes private data 732, which may comprise encrypted first owner private data 833 and encrypted owners private data 834. As described above, encrypted first owner private data 833 may be encrypted using first owner first symmetric key 611 and encrypted owners private data 834 may be encrypted using first owner second symmetric key 612 (See FIG. 7).

As a result of the decryption for the transfer of ownership depicted in FIG. 9, second owner computer 802 may now possess a copy of first owner second symmetric key 612. Second owner computer 802 may utilize first owner second symmetric key 612 to decrypt encrypted owners private data 834. This enables second owner computer 802 to access owners private data 734. Since second owner computer 802 does not possess first owner first symmetric key 611, second owner computer 802 cannot decrypt encrypted first owner private data 833. Thus, first owner private data 733 remains private to only the first owner and first owner computer 702 of appliance 601.

At step 546, second owner computer 505 may generate their own shared secrets (e.g., symmetric keys). In some embodiments, second owner computer 505 may generate two shared secrets including a third shared secret and a fourth shared secret. Second owner computer 505 may utilize these two shared secrets to encrypt their own private data in a similar manner to which first owner computer 502 utilized the first shared secret and the second shared secret. For example, the third shared secret may be utilized to encrypt data that is and always will be private to the second owner (e.g., usage data) and the fourth shared secret may be utilized to encrypt data that is private to the second owner and that will be made available to subsequent owners by providing them with a copy of the fourth shared secret (e.g., repair data).

At step 548, second owner computer 505 may send the shared secrets to appliance 501, which may store a copy of the third shared secret and the fourth shared secret. The two shared secrets may be stored securely within appliance 501, such as in a secure element. There are several ways in which the two shared secrets may be sent to appliance 501. In one case, the shared secrets may be sent to appliance 501 through an out-of-band channel. For example, the shared secrets may be entered manually by the second owner into appliance 501 (e.g., by keying in code using input elements of appliance 501). In another case, the two shared secrets may be encrypted using the public key of appliance 501 and then sent to appliance 501. If the first owner knows the private key of appliance 501, this may potentially expose the shared secrets to the first owner. Thus, it is preferable that the latter approach be utilized when the second owner is confident that the originator of the public-private key pair associated with appliance 501 can be trusted.

In a future transfer of ownership to a third owner of appliance 501, second owner computer 505 may provide the second shared secret and fourth shared secret to provide the third owner access to data intended to be accessible by any subsequent owners of appliance 501. Hence, as appliance 501 changes hands, an ever increasing list of shared secrets (e.g., second shared secret, fourth shared secret, sixth shared secret, etc.) may be passed on to each owner.

Additionally, it is possible that an owner may change their mind about passing on data. For example, while the owner may have originally planned to keep data to themselves, the owner may later decide that they want to make a portion of the data available to the subsequent owner. To do this, the owner may decrypt the portion of data using their first shared secret, re-encrypt the portion of the data using their second shared secret, and add an entry in the appliance data of appliance 501 that references the original entry. In some embodiments, the original entry may be referenced by any suitable identifier (e.g., timestamp, index, etc.).

In another example, while the owner may have originally planned to keep data to themselves, the owner may later decide that they want to share all of it to a subsequent owner. To do this, the owner may simply forward both their shared secrets to the subsequent owner.

In another example, there may be data that was originally expected to be passed on, but which the owner no longer wishes to pass on. In this case, the owner may not pass on their second shared secret, but instead may pass on a third shared secret. The owner may then decrypt any data that they do want to pass on using their second shared secret and re-encrypt the data using the third shared secret. The owner may then only pass on the third shared secret, and not the second shared secret, to the subsequent owner. This process would be visible to the subsequent owner, although the subsequent owner may not be able to guarantee that the re-encrypted data was as originally stored.

While an embodiment in which each owner utilizes two shared secrets to encrypt data is described in flow diagram 500, embodiments are not so limited. For example, each owner may utilize any suitable number of shared secrets to encrypt data and provide any number of the utilized shared secrets to a subsequent owner as desired. In some embodiments, an owner may not provide any shared secrets to a subsequent owner if the owner determines there is no data is to be shared. However, typically, there may be a negotiation process between the entities involved in a transfer of ownership regarding certain data that may be made accessible to a subsequent owner.

Following step 548, additional entries similar to the types of entries described above may be added to the appliance data of appliance 501. For example, appliance 501 may change owners multiple times after the second owner computer 505, and an entry with ownership transfer data may be added to the appliance data for each time. Each owner of appliance 501 may add data to the appliance data, such as usage data, state monitoring data, contract data, and other related data, and sign data as necessary. In some embodiments, one or more trusted third party may sign certain data as well. The entries in the appliance data may be stored in strict sequence, such that the order in which data entries is stored correlates to the order in which the events associated with the data entries occurred. In some cases, all entries may comprise a timestamp.

At 550, final owner computer 506 may insert termination data into the appliance data of appliance 501. Final owner computer 506 may be associated with the final owner of appliance 501. It is presumed that any suitable number of owners may hold ownership of appliance 501 between the time that the second owner and the final owner owns appliance 501. The termination data may indicate the end of the lifecycle of appliance 501 and may be useful to ensure that appliance 501 is disposed of and not resold. There may be various reasons for storing termination data within appliance 501. For example, appliance 501 may have become unsafe and been paid to be taken out of circulation.

The inclusion of termination data may not inherently prevent further use or sale of appliance 501. However, in some embodiments, appliance 501 may include logic to prevent such transactions, or possibly even inactivate itself upon determining that termination data has been stored. Termination data entries may be stored as public data, so that any potential buyer or user of appliance 501 can check to determine whether there is any such entry. Typically, termination data entries may be verified by a third party, such as by third party validator computer 503.

As described above, embodiments of the invention provide several advantages. Embodiments of the invention enable resilience, security, and localization of data. For example, data can be stored within an appliance securely with controlled access rights. Since access to the data can be managed by the appliance itself, protection of data can be maintained regardless of transfers of ownership of the appliance. Further, since data and mechanisms to securely store and retrieve the data exist within the appliance, this forgoes the need to utilize external storage and communicate with a remote server to access the data. This may result in less chance that data may be comprised by a remote entity, as data may just be stored locally within the appliance itself. This is also cost effective as the cost of memory for the appliance may be cheaper than managing storage space and communications with the remote server.

Additionally, embodiments of the invention provide flexibility to the owner of the appliance regarding privacy of data (e.g., what data is private, what data can be passed along to future owners, and what data is public), as well as provide a convenient and secure way for the owner to monitor contextual information related to the appliance.

Additional methods and processes may be included within the above methods and may be recognized by one of ordinary skill in the art, in light of the description herein. Further, in some embodiments of the present invention, the described methods herein may be combined, mixed, and matched, as one of ordinary skill would recognize.

II. Exemplary Computer System

A computer system may be utilized to implement any of the entities or components described above. Subsystems of the computer system may be interconnected via a system bus. Additional subsystems may include a printer, a keyboard, a fixed disk (or other memory comprising computer readable media), a monitor, which is coupled to a display adapter, and others. Peripherals and input/output (I/O) devices, which couple to an I/O controller (which can be a processor or other suitable controller), can be connected to the computer system by any number of means known in the art, such as by a serial port. For example, the serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer readable medium. In some embodiments, the monitor may be a touch sensitive display screen.

A computer system can include a plurality of the same components or subsystems, e.g., connected together by external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A second device associated with a second user, the second device comprising:
a processor; and
a computer-readable medium coupled to the processor, including code that is executable by the processor, for implementing a method comprising:
providing to an appliance that encrypts users private data to form encrypted users private data and stores the encrypted users private data, and that is separate from the second device, a decryption request for transfer data stored in the appliance, the transfer data including an encrypted second key formed by encrypting a second key, wherein the second key was encrypted by a first device separate from the appliance and associated with a first user, using a public key obtained from the second device and transmitted by the first device to the appliance, wherein the first device accessed the encrypted users private data using the second key;
receiving, by the second device, the transfer data from the appliance; and
decrypting, by the second device, using a private key of the second device, the encrypted second key to recover the second key, wherein the second key is capable of accessing the encrypted users private data on the appliance, and wherein the method further comprises:
providing, to the appliance by the second device, a request for the encrypted users private data; and
decrypting, by the second device, the encrypted users private data with the second key,
wherein the method further comprises:
generating a symmetric key pair including a first symmetric key and a second symmetric key; and
providing the first symmetric key and the second symmetric key to the appliance, and
wherein the first symmetric key is used to encrypt data only viewable by the second user of the second device while the appliance is being used by the second user.

2. The second device of claim 1, wherein the transfer data further comprises, in encrypted form, information regarding a time and date of transfer of the appliance from the first user of the first device to the second user of the second device.

3. The second device of claim 1, wherein the transfer data comprises ownership transfer data.

4. The second device of claim 1, wherein the second symmetric key is used to encrypt data that is viewed by the second user as well as subsequent users of the appliance.

5. The second device of claim 1, wherein the appliance is a household appliance.

6. The second device of claim 1, wherein the appliance stores first user private data associated with the first user of the first device in encrypted form.

7. The second device of claim 6, wherein the appliance stores a digest of the first user private data and the users private data.

8. The method of claim 1, wherein the appliance is a washing machine.

9. The method of claim 1, wherein the users private data comprises transit data associated with the appliance.

10. A method comprising:
providing, by a second device associated with a second user, to an appliance that encrypts users private data to form encrypted users data and stores the encrypted users private data, and that is separate from the appliance, a decryption request for transfer data stored in the appliance, the transfer data including an encrypted second key formed by encrypting a second key, wherein the second key was encrypted by a first device that is separate from the appliance and that is associated with a first user, using a public key obtained from the second device and transmitted by the first device to the appliance, wherein the first device accessed the encrypted users private data using the second key;
receiving, by the second device, the transfer data from the appliance; and
decrypting, by the second device, using a private key of the second device, the encrypted second key to recover the second key, wherein the second key is capable of accessing the encrypted users private data on the appliance, and wherein the method further comprises:
providing, to the appliance by the second device, a request for the encrypted users private data; and
decrypting, by the second device, the encrypted users private data with the second key, and wherein the method further comprises:
generating a symmetric key pair including a first symmetric key and a second symmetric key; and
providing the first symmetric key and the second symmetric key to the appliance, and
wherein the first symmetric key is used to encrypt data only viewable by the second user of the second device while the appliance is being used by the second user.

11. The method of claim 10, wherein the transfer data further comprises, in encrypted form, information regarding a time and date of transfer of the appliance from the first user of the first device to the second user of the second device.

12. The method of claim 10, wherein the transfer data comprises ownership transfer data.

13. The method of claim 10, wherein the second symmetric key is used to encrypt data that is viewed by the second user as well as subsequent users of the appliance.

14. The method of claim 10, wherein the appliance is a household appliance.

15. The method of claim 10, wherein the appliance stores first user private data associated with the first user of the first device in encrypted form.

16. The method of claim 15, wherein the appliance stores a digest of the first user private data and the users private data.

* * * * *